US012621453B2

(12) United States Patent　(10) Patent No.: US 12,621,453 B2

Le Leannec et al.　(45) Date of Patent: May 5, 2026

(54) REDUCING THE NUMBER OF REGULAR CODED BINS IN ENTROPY CODING IN VIDEO ENCODING AND DECODING

(71) Applicant: InterDigital VC Holdings, Inc., Wilmington, DE (US)

(72) Inventors: Fabrice Le Leannec, Cesson-Sevigne (FR); Tangi Poirier, Cesson-Sevigne (FR); Ya Chen, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 292 days.

(21) Appl. No.: 17/417,078

(22) PCT Filed: Mar. 4, 2020

(86) PCT No.: PCT/US2020/021011

§ 371 (c)(1),
(2) Date: Jun. 21, 2021

(87) PCT Pub. No.: WO2020/185468

PCT Pub. Date: Sep. 17, 2020

(65) Prior Publication Data

US 2022/0078428 A1　Mar. 10, 2022

(30) Foreign Application Priority Data

Mar. 11, 2019　(EP) ..................................... 19305278
May 29, 2019　(EP) ..................................... 19305693

(51) Int. Cl.
H04N 19/13　(2014.01)
H04N 19/176　(2014.01)
(Continued)

(52) U.S. Cl.
CPC ........... *H04N 19/13* (2014.11); *H04N 19/176* (2014.11); *H04N 19/70* (2014.11); *H04N 19/91* (2014.11)

(58) Field of Classification Search
None
See application file for complete search history.

(56) References Cited

U.S. PATENT DOCUMENTS

2013/0114667 A1　5/2013　Auyeung
2013/0272377 A1　10/2013　Karczewicz et al.
(Continued)

FOREIGN PATENT DOCUMENTS

CN　103222269 A　7/2013
CN　103918272 A　7/2014
(Continued)

OTHER PUBLICATIONS

Bross et al., "Versatile Video Coding (Draft 4)", Document: JVET-M1001-v5, Joint Video ExpertsTeam (JVET) of ITU-T SG 16 WP 3 and ISO/IEC JTC 1/SC 29/WG 11, 13th Meeting: Marrakech, MA, pp. 1-284, Jan. 9-18, 2019.
(Continued)

*Primary Examiner* — Samuel D Fereja
(74) *Attorney, Agent, or Firm* — Xiaoan Lu

(57) ABSTRACT

To encode with CABAC, a non-binary syntax element value is mapped to a binary sequence (bin string), through a binarization process. A binary arithmetic coding engine encodes or decodes a bin, in a regular (context-based) mode and a bypass mode.

20 Claims, 23 Drawing Sheets

(51) Int. Cl.
  *H04N 19/70* (2014.01)
  *H04N 19/91* (2014.01)

(56) References Cited

U.S. PATENT DOCUMENTS

| | | | |
|---|---|---|---|
| 2013/0336382 A1 | 12/2013 | Sole et al. | |
| 2014/0286417 A1 | 9/2014 | Gamei et al. | |
| 2014/0362925 A1 | 12/2014 | Nguyen et al. | |
| 2016/0065964 A1 | 3/2016 | Zhang et al. | |
| 2016/0330479 A1 | 11/2016 | Liu et al. | |
| 2017/0094300 A1 | 3/2017 | Chou et al. | |
| 2017/0324960 A1 | 11/2017 | Lim et al. | |
| 2018/0278946 A1 | 9/2018 | Said et al. | |
| 2018/0332298 A1 | 11/2018 | Liu et al. | |
| 2021/0051339 A1* | 2/2021 | Liu | H04N 19/105 |
| 2021/0195227 A1* | 6/2021 | Lee | H04N 19/513 |
| 2021/0227224 A1* | 7/2021 | Lim | H04N 19/136 |
| 2022/0014730 A1* | 1/2022 | Jeong | H04N 19/105 |
| 2022/0078428 A1 | 3/2022 | Le et al. | |
| 2022/0086486 A1* | 3/2022 | Lim | H04N 19/196 |
| 2022/0286683 A1* | 9/2022 | Sze | H04N 19/70 |

FOREIGN PATENT DOCUMENTS

| | | | |
|---|---|---|---|
| CN | 103931188 A | 7/2014 | |
| CN | 104221374 A | 12/2014 | |
| CN | 105659605 A | 6/2016 | |
| GB | 2496209 A | 5/2013 | |
| JP | 2019036772 A | 3/2019 | |
| KR | 19990026862 A | 4/1999 | |
| WO | WO2020101429 A1 | 5/2020 | |
| WO | WO2020185468 A1 | 9/2020 | |

OTHER PUBLICATIONS

Chen et al., "EE3: Generalized bi-prediction", Document: JVET-D0102, Joint Video Exploration Team (JVET) of ITU-T SG 16 WP 3 and ISO/IEC JTC 1/SC 29/WG 11 4th Meeting: Chengdu, CN, pp. 1-5, 15-21, Oct. 2016.

Xu et al., "Description of Core experiment 8 (CE8): Screen Content Coding Tools", Document: JVET-M1028-v4, 11 Joint Video Experts Team (JVET) of ITU-T SG 16 WP 3 and ISO/IEC JTC 1/SC 29/WG 11, 13th Meeting: Marrakech, MA, pp. 1-18, Jan. 9-18, 2019.

Bross et al., "Versatile Video Coding (Draft 5) ", Document: JVET-N1001-v5, Joint Video Experts Team (JVET) of ITU-T SG 16 WP 3 and ISO/IEC JTC 1/SC 29/WG 11, 14th Meeting: Geneva, CH, pp. 1-370, Mar. 19-27, 2019.

Leannec et al., "CE4-related: Simplified coding of the BPW index", Document: JVET-N0286, Joint Video Experts Team (JVET) of ITU-T SG 16 WP 3 and ISO/IEC JTC 1/SC 29/WG 11, 14th Meeting: Geneva, CH, Mar. 19-27, 2019, 10 pages.

* cited by examiner

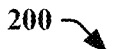
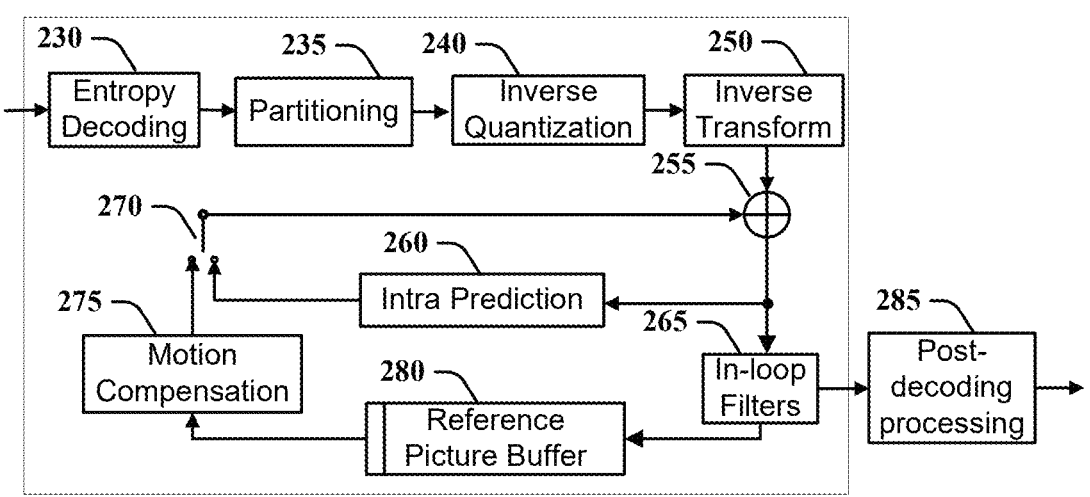
FIG. 4

NO_SPLIT          QT_SPLIT          HOR

VER          HOR_TRIPLE          VER_TRIPLE

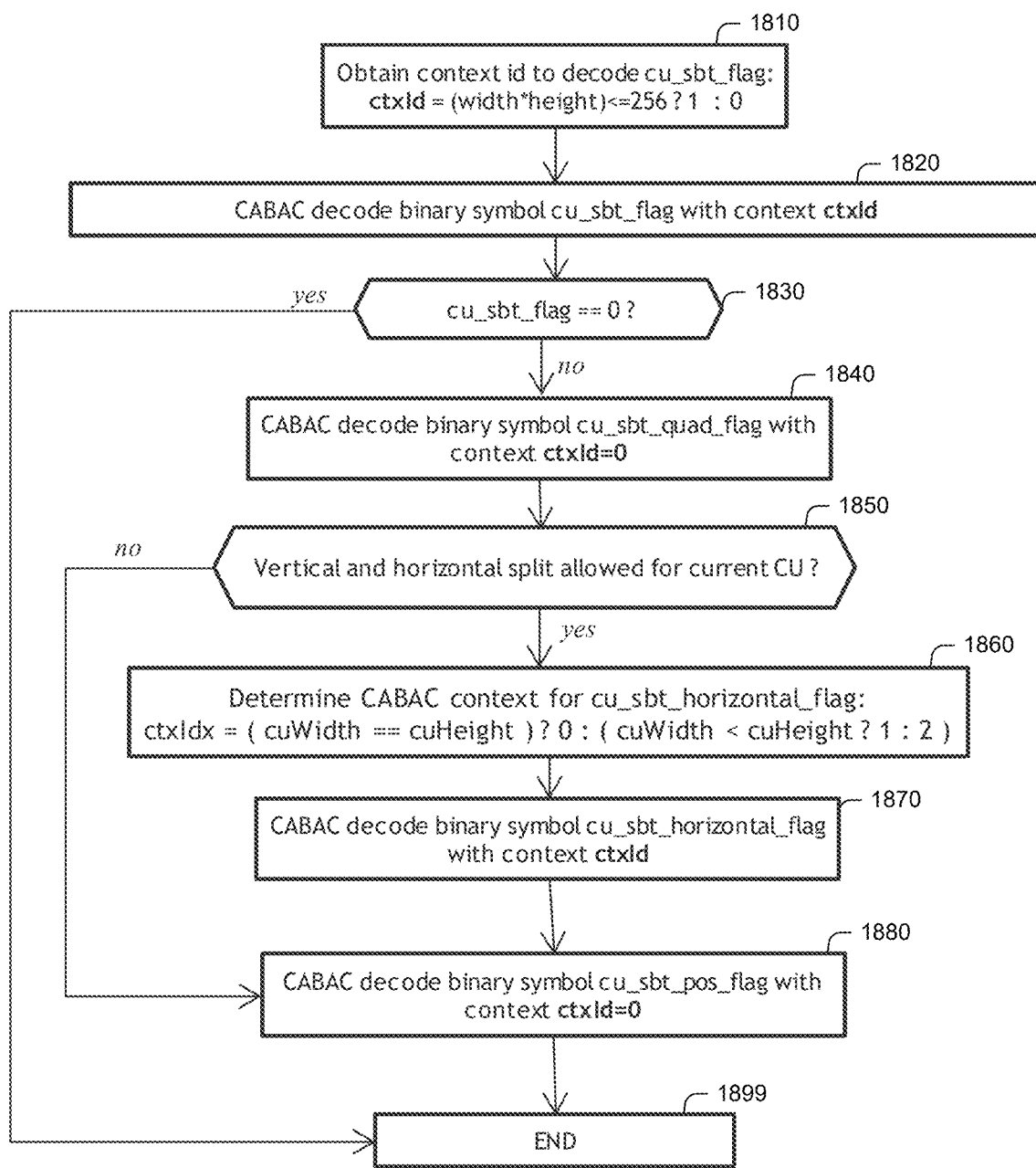

1810
Obtain context id to decode cu_sbt_flag:
ctxId = (width*height)<=256 ? 1 : 0

1820
CABAC decode binary symbol cu_sbt_flag with context ctxId 1830
cu_sbt_flag == 0 ?
yes
no 1840
CABAC decode binary symbol cu_sbt_quad_flag with context ctxId=0

1850
Vertical and horizontal split allowed for current CU ?
no
yes

1860
Determine CABAC context for cu_sbt_horizontal_flag:
ctxIdx = ( cuWidth == cuHeight ) ? 0 : ( cuWidth < cuHeight ? 1 : 2 )

1870
CABAC decode binary symbol cu_sbt_horizontal_flag with context ctxId

1880
CABAC decode binary symbol cu_sbt_pos_flag with context ctxId=0

1899
END

FIG. 18 (Prior Art)

REDUCING THE NUMBER OF REGULAR CODED BINS IN ENTROPY CODING IN VIDEO ENCODING AND DECODING

This application claims the benefit, under 35 U.S.C. § 371 of International Application No. PCT/US2020/021011, filed Mar. 4, 2020, which was published on Sep. 17, 2020, which claims the benefit of European Patent Application Nos. EP19305278.4 filed Mar. 11, 2019 and EP19305693.4 filed May 29, 2019.

TECHNICAL FIELD

The present embodiments generally relate to a method and an apparatus for video encoding or decoding, and more particularly, to a method and an apparatus for reducing the number of regular coded bins in entropy encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video decoding is provided, comprising: decoding a plurality of binary symbols from a bitstream, wherein the first binary symbol of said plurality of binary symbols is entropy decoded using a context-based mode, and wherein each binary symbol following the first binary symbol is to be entropy decoded in a bypass mode; obtaining an index represented by said plurality of binary symbols, corresponding to a binarization scheme; and forming prediction for a block as a weighted sum of two predictors, wherein the index indicates respective weighting factors used in weighting said two predictors when forming said weighted sum.

According to an embodiment, a method of video encoding is provided, comprising: accessing a block to be encoded; forming prediction for the block as a weighted sum of two predictors; and encoding an index to indicate respective weighting factors used in weighting said two predictors when forming said weighted sum, wherein said index is binarized, using a binarization scheme, into a plurality of binary symbols, wherein the first binary symbol of said plurality of binary symbols is entropy encoded using a context-based mode, and wherein each binary symbol following the first binary symbol is to be entropy encoded in a bypass mode.

According to another embodiment, an apparatus for video decoding is provided, comprising one or more processors, wherein said one or more processors are configured to: decode a plurality of binary symbols from a bitstream, wherein the first binary symbol of said plurality of binary symbols is entropy decoded using a context-based mode, and wherein each binary symbol following the first binary symbol is to be entropy decoded in a bypass mode; obtain an index represented by said plurality of binary symbols, corresponding to a binarization scheme; and form prediction for a block as a weighted sum of two predictors, wherein the index indicates respective weighting factors used in weighting said two predictors when forming said weighted sum.

According to another embodiment, an apparatus for video encoding is provided, comprising one or more processors, wherein said one or more processors are configured to: access a block to be encoded; form prediction for the block as a weighted sum of two predictors; and encode an index to indicate respective weighting factors used in weighting said two predictors when forming said weighted sum, wherein said index is binarized, using a binarization scheme, into a plurality of binary symbols, wherein the first binary symbol of said plurality of binary symbols is entropy encoded using a context-based mode, and wherein each binary symbol following the first binary symbol is to be entropy encoded in a bypass mode.

According to another embodiment, an apparatus of video decoding is provided, comprising: means for decoding a plurality of binary symbols from a bitstream, wherein the first binary symbol of said plurality of binary symbols is entropy decoded using a context-based mode, and wherein each binary symbol following the first binary symbol is to be entropy decoded in a bypass mode; means for obtaining an index represented by said plurality of binary symbols, corresponding to a binarization scheme; and means for forming prediction for a block as a weighted sum of two predictors, wherein the index indicates respective weighting factors used in weighting said two predictors when forming said weighted sum.

According to another embodiment, an apparatus of video encoding is provided, comprising: means for accessing a block to be encoded; means for forming prediction for the block as a weighted sum of two predictors; and means for encoding an index to indicate respective weighting factors used in weighting said two predictors when forming said weighted sum, wherein said index is binarized, using a binarization scheme, into a plurality of binary symbols, wherein the first binary symbol of said plurality of binary symbols is entropy encoded using a context-based mode, and wherein each binary symbol following the first binary symbol is to be entropy encoded in a bypass mode.

BRIEF DESCRIPTION OF THE DRAWINGS

FIG. 4 illustrates a block diagram of an embodiment of a video decoder.

FIG. 18 illustrates a process of decoding the SBT mode of an INTER coding unit in VVC draft 5.

DETAILED DESCRIPTION

Figure 1:
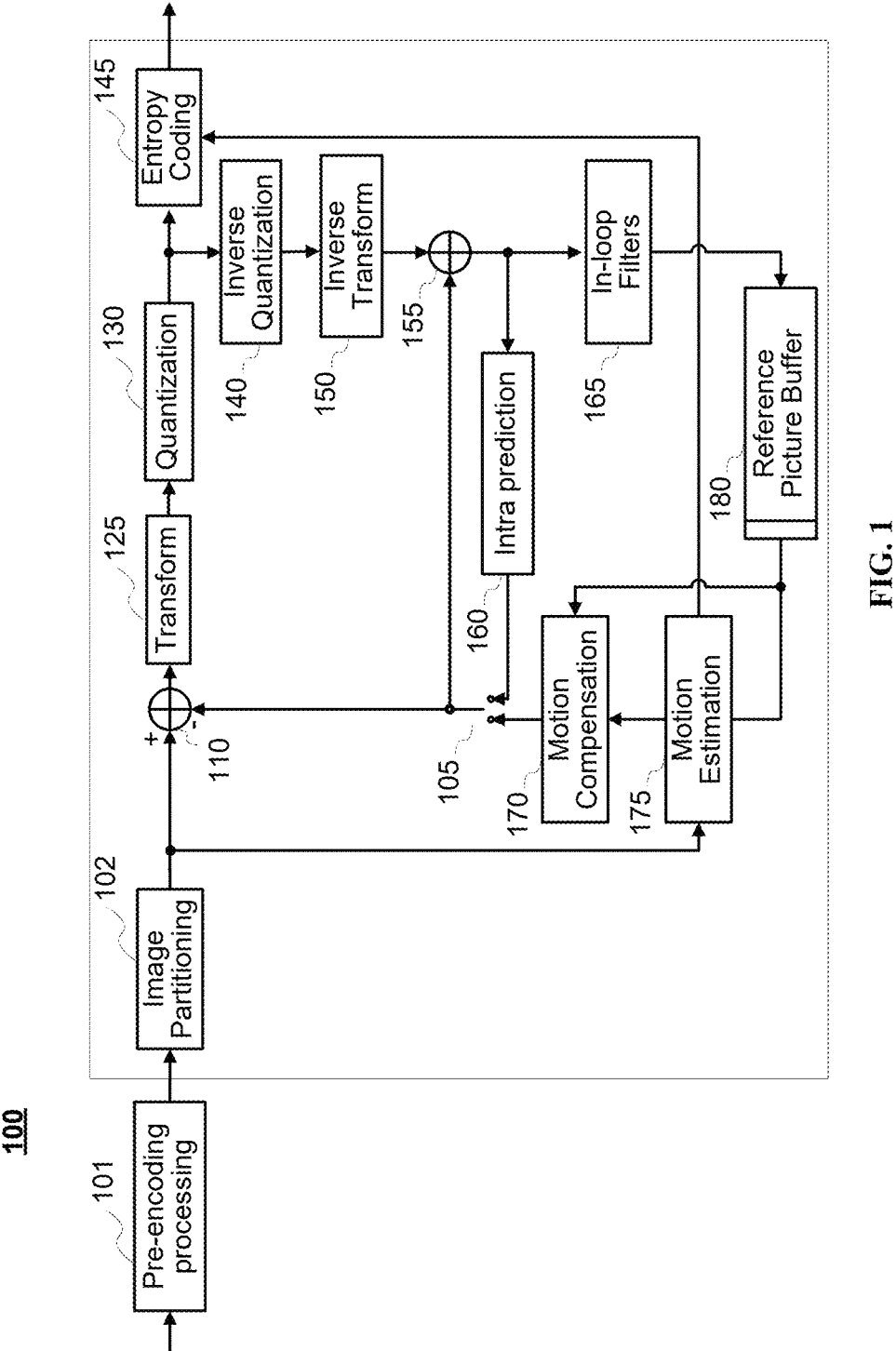
FIG. 1 illustrates a block diagram of an embodiment of a video encoder.

FIG. 1 illustrates an example video encoder 100, such as a High Efficiency Video Coding (HEVC) encoder. FIG. 1 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

To encode a video sequence with one or more pictures, a picture is partitioned (102), for example, into one or more slices where each slice can include one or more slice segments. In HEVC, a slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

Figure 2:
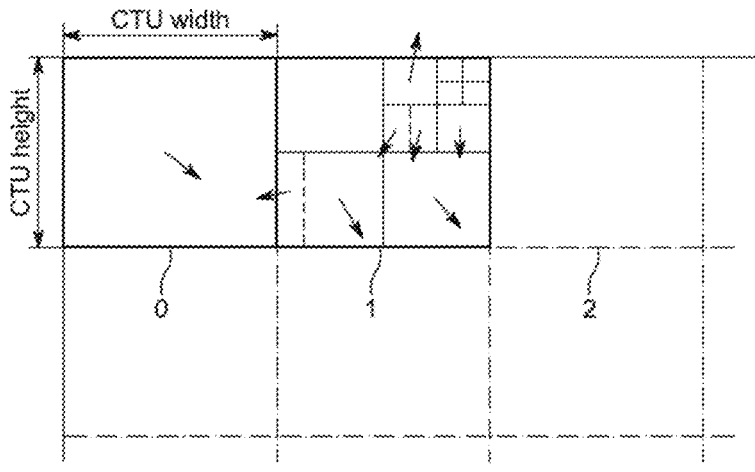
FIG. 2 is a pictorial example illustrating Coding Tree Unit and Coding Tree concepts to represent a compressed HEVC picture.
Figure 3:
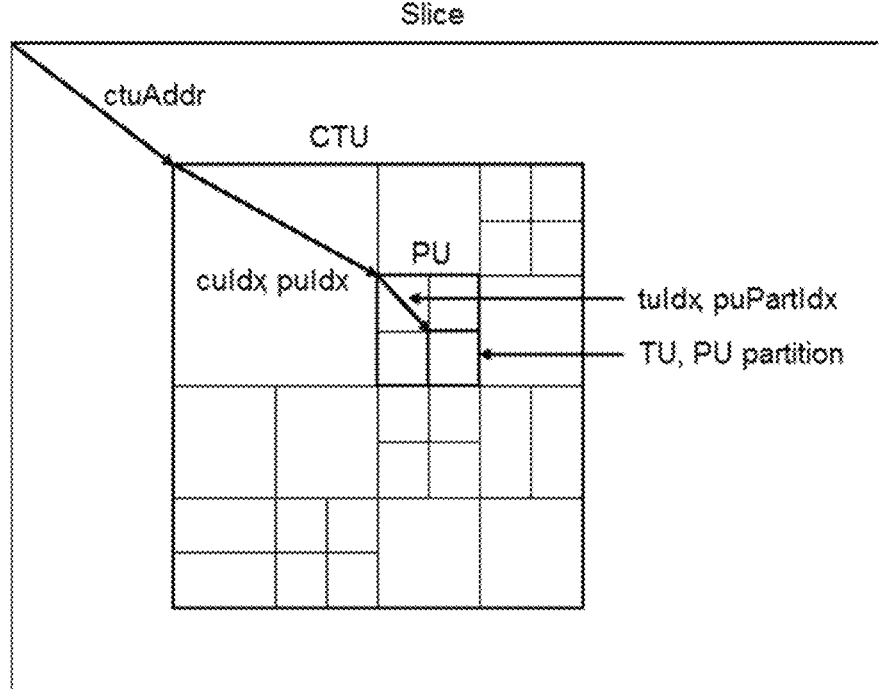
FIG. 3 is a pictorial example illustrating division of a Coding Tree Unit into Coding Units, Prediction Units and Transform Units.

For coding according to HEVC, as illustrated in FIG. 2, a picture is partitioned into coding tree blocks (CTB) of square shape with a configurable size (typically at 64×64, 128×128, or 256×256 pixels), and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs), as illustrated in FIG. 3. Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the encoder 100, a picture is encoded by the encoder elements as described below. The picture to be encoded is processed in units of, for example, CUs. Each coding unit is encoded using either an intra or inter mode. When a coding unit is encoded in an intra mode, it performs intra prediction (160). In an inter mode, motion estimation (175) and compensation (170) are performed. The encoder decides (105) which one of the intra mode or inter mode to use for encoding the coding unit, and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. As a non-limiting example, context-based adaptive binary arithmetic coding (CABAC) can be used to encode syntax elements into the bitstream.

To encode with CABAC, a non-binary syntax element value is mapped to a binary sequence, called a bin string, through a binarization process. For a bin, a context model is selected. A "context model" is a probability model for one or more bins and is chosen from a selection of available models depending on the statistics of recently coded symbols. The context model of each bin is identified by a context model index (also used as "context index"), and different context indices correspond to different context models. The context model stores the probability of each bin being '1' or '0', and can be adaptive or static. The static model triggers a coding engine with an equal probability for bins '0', and '1'. In the adaptive coding engine, the context model is updated based on the actual coded value of a bin. The operation modes corresponding to the adaptive and static models are called the regular mode and the bypass mode, respectively. Based on the context, a binary arithmetic coding engine encodes or decodes a bin according to the corresponding probability model.

The encoder may also skip the transform and apply quantization directly to the non-transformed residual signal, for example, on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

FIG. 4 illustrates a block diagram of an example video decoder 200, such as an HEVC decoder. In the decoder 200, a bitstream is decoded by the decoder elements as described below. Video decoder 200 generally performs a decoding pass reciprocal to the encoding pass as described in FIG. 1, which performs video decoding as part of encoding video data. FIG. 4 may also illustrate a decoder in which improvements are made to the HEVC standard or a decoder employing technologies similar to HEVC, such as a VVC decoder.

In particular, the input of the decoder includes a video bitstream, which may be generated by video encoder 100. The bitstream is first entropy decoded (230) to obtain transform coefficients, motion vectors, picture partitioning information, and other coded information. If CABAC is used for entropy coding, the context models are initialized in the same manner as the encoder context models, and syntax elements are decoded from the bitstream based on the context models.

Figure 5:
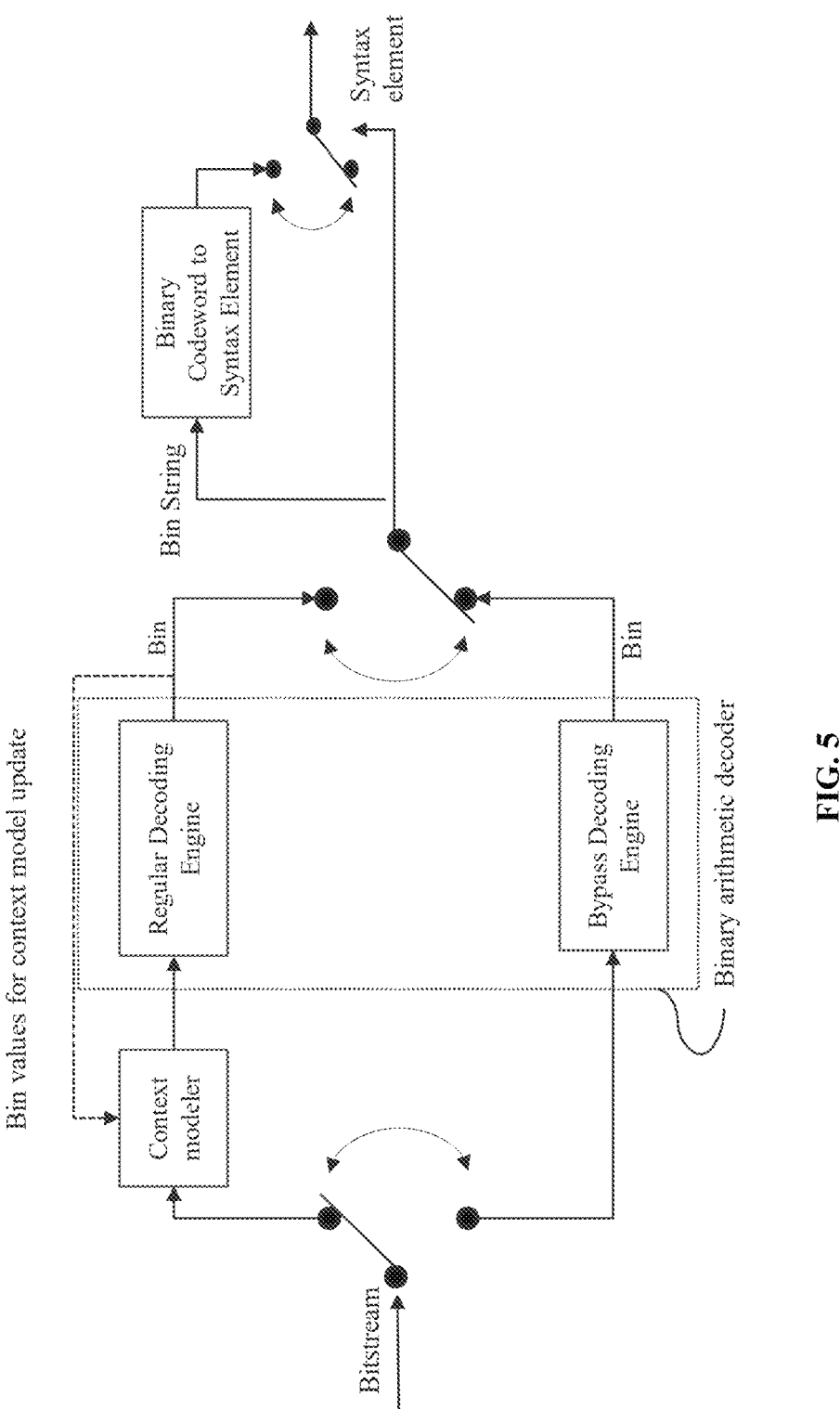
FIG. 5 illustrates a CABAC decoding process.
Figure 6:
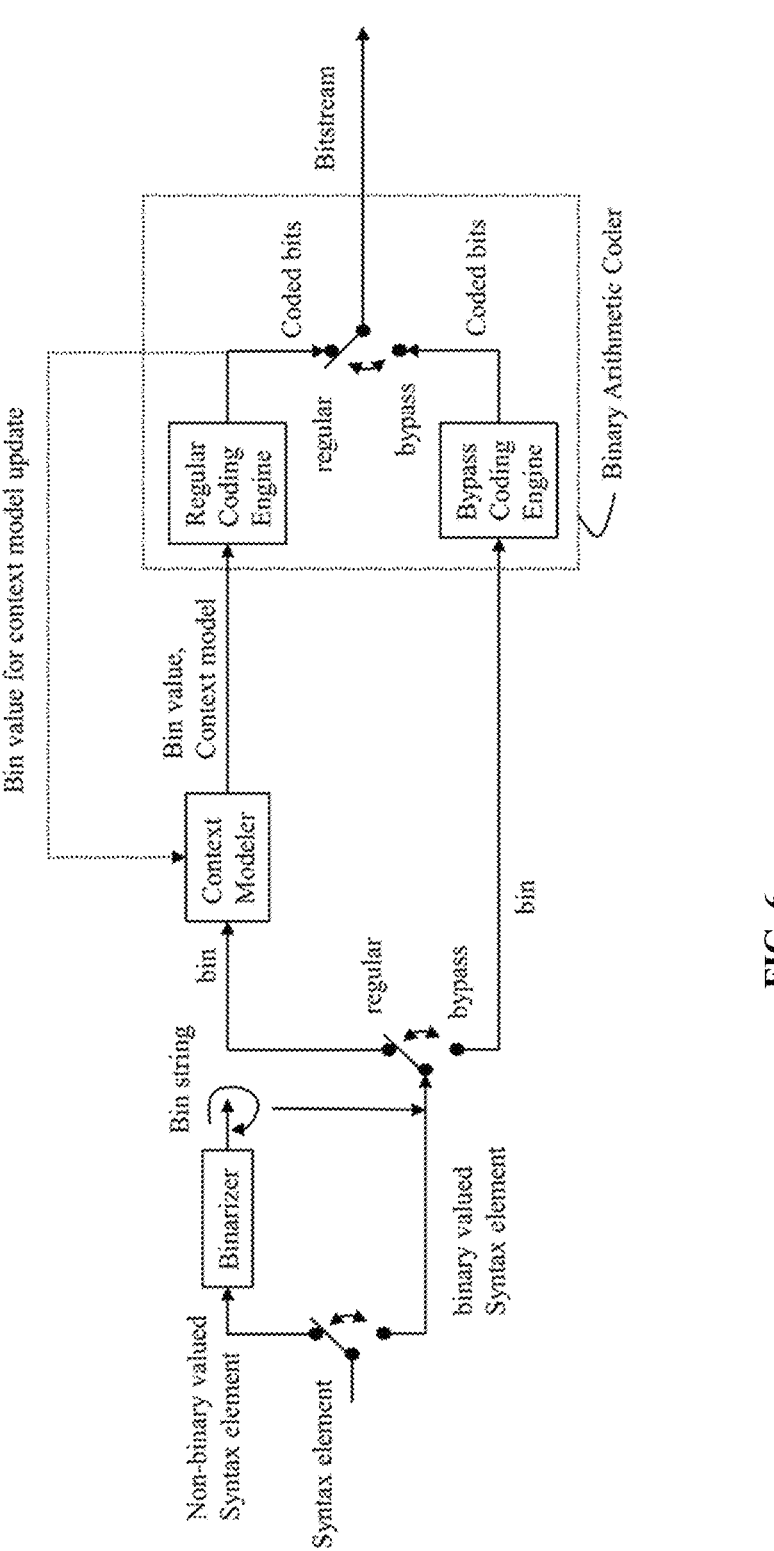
FIG. 6 illustrates a CABAC encoding process.

FIG. 5 depicts the CABAC decoding process of a syntax element given the input coded bitstream. This is the reciprocal process of the syntax element coding process of FIG. 6.

The input to the process of FIG. 5 includes the coded bitstream, typically conforming to a video compression standard, such as HEVC or VVC. At any point of the decoding process, the decoder knows which syntax element is to be decoded next. This is fully specified in the standardized bitstream syntax and decoding process. Moreover, it also knows how the current syntax element to decode is binarized (i.e., represented as a sequence of binary symbols called bins, each equal to '1' or '0'), and how each bin of the bin string has been encoded.

Therefore, the first stage of the CABAC decoding process (left side of FIG. 5) decodes a series of bins. For each bin, the decoder knows if the bin has been encoded according to the bypass mode or the regular mode. The bypass mode consists in simply reading a bit in the bit-stream and assigning the so-obtained bit value to current bin. This mode has the advantage of being straightforward, hence fast. It is typically efficient thus used for bins that have a uniform statistical distribution, i.e., equal probability of being equal to '1' or '0'.

On the opposite, if the current bin is not coded in the bypass mode, then it means it has been coded in the so-called regular mode, i.e., through context-based arithmetic coding. In that case, the decoding of the considered bin proceeds as follows. First, a context is obtained for the decoding of current bin, using the context modeler module. The goal of the context is to obtain the conditional probability that current bin has value '0', given some contextual or prior information X. The prior X here can be the value of some already decoded syntax element, available both on the encoder and decoder side in a synchronous way, at the time the current bin is being decoded.

Typically, the prior X used for the decoding of a bin is specified in the standard, and is chosen because it is statistically correlated with the current bin to decode. The interest of using this contextual information is that it reduces the rate cost of coding the bin. This is based on the fact that the conditional entropy of the bin given X is lower, when the bin and X are more correlated. The following relationship is well-known in information theory: H(bin|X)<H(bin)

It means that the conditional entropy of bin knowing X is lower than the entropy of bin if bin and X are statistically correlated. The contextual information X is thus used to obtain the probability of bin being '0' or '1'. Given these conditional probabilities, the regular decoding engine performs the arithmetic decoding of the binary value bin. The value of bin is then used to update the value of the conditional probabilities associated with the current bin, knowing the current contextual information X. This is called the context model updating. Updating the context model for each bin as long as the bins are being decoded (or coded), allows progressively refining the context modeling for each binary element. Thus, the CABAC decoder progressively learns the statistical behavior of each regular-encoded bin. Note that the context modeler and the context model updating steps are strictly identical operations on the encoder and on the decoder sides.

The regular arithmetic decoding of the current bin or its bypass decoding, depending on how it was coded, leads to a series of decoded bins.

The second phase of the CABAC decoding, shown on right side of FIG. 5, then converts this series of binary symbols into syntax elements. A syntax element may take the form of a flag, in which case it directly takes the value of current decoded bins. On the other side, if the binarization of current syntax element corresponds to a set of several bins according to considered standard specification, a conversion of binary codeword to syntax element takes place.

This proceeds the reciprocal of the binarization step that was done by the encoder. The inverse conversion performed here thus obtains the value of these syntax elements based on their respective decoded binarized versions.

For example, syntax elements corresponding to the prefix code of the last significant coefficient position and the merge index (indicating the position of candidate in the list of merge candidates) are binarized using the truncated Rice binarization. For the last significant coefficient position flag, all bins are encoded in the regular mode; for the merge index, the first bin is encoded in the regular mode, and other bins in the bypass mode.

The picture partitioning information indicates how the picture is partitioned, for example, the size of the CTUs, and a manner a CTU is split into CUs, and possibly into PUs when applicable. The decoder may therefore divide (235)

the picture, for example, into CTUs, and each CTU into CUs, according to the decoded picture partitioning information. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g., conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Recently new emerging video compression tools including new Coding Tree Unit representation in the compressed domain are proposed, in order to represent picture data in a more flexible way in the compressed domain. With a more flexible representation of the coding tree, compression efficiency may be increased compared to the CU/PU/TU arrangement of the HEVC standard.

Figure 7:
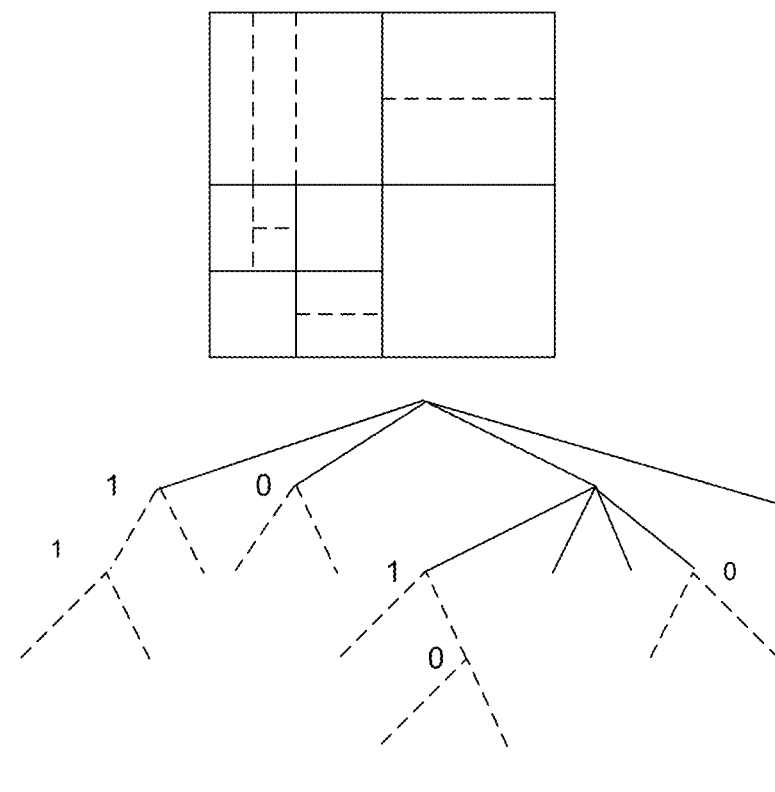
FIG. 7 is a pictorial example illustrating Quad-Tree Plus Binary-Tree (QTBT) CTU representation.

In one example, the Quad-Tree plus Binary-Tree (QTBT) coding tool is a new tool that provides increased flexibility. In a QTBT coding tree, coding units can be split both in a quad-tree and in a binary-tree fashion. In the QTBT technology, a CU has either square or rectangular shape. The size of coding unit is always a power of 2, and typically goes from 4 to 128. An example of QTBT coding tree representation of a Coding Tree Unit is illustrated in FIG. 7.

The splitting of a coding unit is decided on the encoder side through a rate distortion optimization procedure, which may be performed by determining the QTBT representation of the CTU with the minimal rate distortion cost. The QTBT decomposition of a CTU is made of two stages: first the CTU is split in a quad-tree fashion, then each quad-tree leaf can be further divided in a binary fashion, as illustrated in FIG. 7 where solid lines represent the quad-tree decomposition phase and dashed lines represent the binary decomposition that is spatially embedded in the quad-tree leaves. In intra slices, the Luma and Chroma block partitioning structure is separated, and decided independently.

No more CU partitioning into predictions units or transform unit is employed. In other words, each Coding Unit is systematically made of a single prediction unit (2N×2N prediction unit partition type) and single transform unit (no division into a transform tree).

Figure 8:
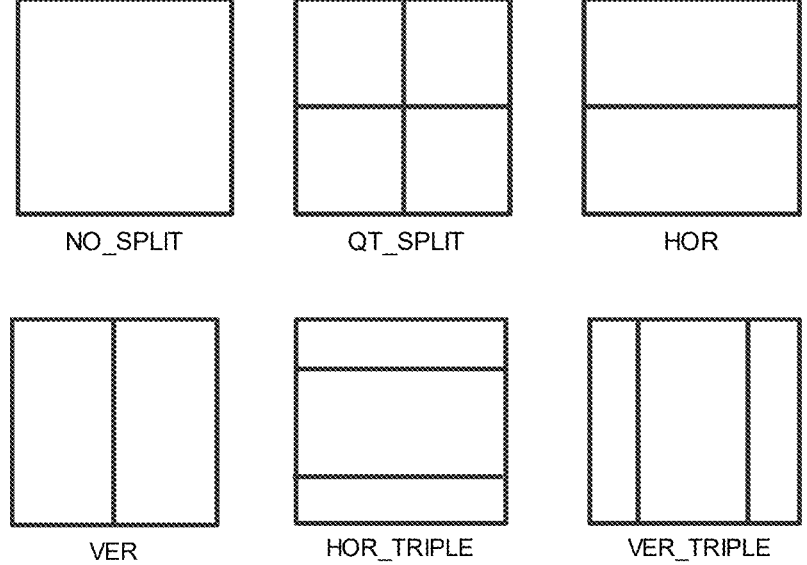
FIG. 8 is a pictorial example illustrating Coding Unit splitting modes.

An additional CU split mode adopted in the VVC (Versatile Video Coding) video compression standard, called the horizontal or vertical triple tree splitting mode (HOR_TRIPLE, VER_TRIPLE), consists in dividing a coding unit (CU) into three sub-coding-units (sub-CUs), with respective sizes equal to ¼, ½ and ¼ of the parent CU size in the direction of the considered spatial division, as illustrated in FIG. 8.

The present embodiments are directed to encoding and decoding of syntax elements. In some embodiments, entropy coding of some intra or inter prediction parameters are modified in order to reduce complexity.

As described above, many binary symbols (or bins) are coded and decoded through the context-adaptive binary arithmetic coding process. This process involves two ways of coding bins: the regular mode and the bypass mode. The bypass coding mode is much less complex than the regular coding mode. Thus, it is of interest to replace the regular coding process by the bypass coding process, when no or little coding efficiency improvement is obtained with the regular coding mode compared with the bypass coding.

In one embodiment, the bypass coding process is used to signal the first one or more bins of a bin string representing the generalized bi-prediction index. In another embodiment, the bypass coding process is used, instead of the regular coding process, to signal which motion vector predictor is used to encode the motion vector of a coding unit (CU) coded in the AMVP mode.

Indeed, it has been detected that the conditional entropy of the bins to encode in these syntax elements is close to 1 bit of information despite the use of context-based arithmetic coding for these bins in the current VVC coding system. Moreover, experimental results show that there is negligible impact on VVC compression performance by using the proposed bypass coding.

In the following, we describe the signaling of the generalized bi-prediction index and the motion vector predictor in further detail.

Signaling of the Generalized Bi-Prediction Index

Generalized Bi-Prediction in VVC Draft 4

In VVC draft 4 (see "Versatile Video Coding (Draft 4)", B. Bross et al., 13$^r$ JVET meeting, Jan. 9-18, 2019, Marrakech), an inter CU may be temporally predicted through the use of so-called generalized bi-prediction (GBi). In generalized bi-prediction, the temporal prediction of a bi-predicted block is computed as the weighted average of two reference blocks, according to the following expression:

$$P_{bipred}=((8-w)\times P_0+w\times P_1+4)>>3$$

where $P_0$ and $P_1$ are temporal predictors, and w is chosen in the following set:

For low-delay pictures (which have all their reference pictures in the past): $w\in\{-2, 3, 4, 5, 10\}$. For non-low-delay pictures (which have at least one past and one future reference picture): $w\in\{3, 4, 5\}$ The GBi weight w is chosen based on the rate distortion optimization process on the encoder side and is signaled in the bitstream. GBi is also combined with various motion compensation tools in VVC, like affine motion compensation or adaptive motion vector resolution.

The syntax element that signals the GBi weight used to predict a CU is called the GBi index.

Coding of the GBi Index in VVC Draft 4 (Encoder)

In VVC draft 4, the GBi index is first converted to another index, gbiCodingIndex. A flag is determined to indicate whether the default weight (equal weight) is to be used. The flag is set to 1 for the default weight w=4 (equal weights for both predictors $P_0$ and $P_1$), and 0 for other weights. The remaining gbiCodingIndex is binarized using the truncated Rice (truncated unary) bin string. The flag or each bin of the truncated Rice bin string is CABAC-encoded, with a dedicated CABAC context. In particular, the flag is context-based coded (i.e., using a regular mode) with context model ID 0. The bins, bin1, bin2, and bin3, are context-based coded with context model IDs 4, 5 and 6, respectively.

Table 1 illustrates the GBi index (GBiIdx) coding for the low-delay mode, where the number of GBi modes is set as numGBiModes=5, the maximum number of bins in addition to the first one is set as numBins=3.

TABLE 1

| | GBi | | | | bin | | |
| w | Index | gbiCodingIndex | flag | Context | string | Contexts | gbiParsingOrder |
|---|---|---|---|---|---|---|---|
| | | | | low-delay mode | | | |
| −2 | 0 | 4 | 0 | [0] | 000 | [4, 5, 6] | 0 |
| 3 | 1 | 2 | 0 | [0] | 01 | [4] | 1 |
| 4 | 2 | 0 | 1 | [0] | — | — | 2 |
| 5 | 3 | 1 | 0 | [0] | 1 | [4, 5] | 3 |
| 10 | 4 | 3 | 0 | [0] | 001 | [4, 5, 6] | 4 |

Table 2 illustrates the GBi index coding for the non-low-delay mode, where the number of GBi mode is set as numGBiModes=3, the maximum number of bins in addition to the first one is set as numBins=1.

TABLE 2

| | GBi | | | | bin | | |
| w | Index | gbiCodingIndex | flag | Context | string | Context | gbiParsingOrder |
|---|---|---|---|---|---|---|---|
| | | | | non-low-delay mode | | | |
| 3 | 1 | 2 | 0 | [0] | 0 | [4] | 1 |
| 4 | 2 | 0 | 1 | [0] | — | — | 2 |
| 5 | 3 | 1 | 0 | [0] | 1 | [4] | 3 |

It should be noted that the concatenation of the flag and the bin string as shown in Table 1 and Table 2 can be considered as the truncate Rice binarization of gbiCodingIndex directly. Namely the gbiCodingIndex is binarized using the truncated Rice (truncated unary) bin string. Each bin is CABAC-encoded, with a dedicated CABAC context. In particular, the first bin, bin0, is context-based coded (i.e., using a regular mode) with context model ID 0. Note that the first bin is set to 1 for the default weight w=4 (equal weights for both predictors $P_0$ and $P_1$) and 0 for other weights. Thus, the first bin can also be considered as a flag to indicate whether the default weight is to be used. Then, subsequent bins bin1, bin2, and bin3 are context-based coded with context model IDs 4, 5 and 6, respectively.

Figure 9:
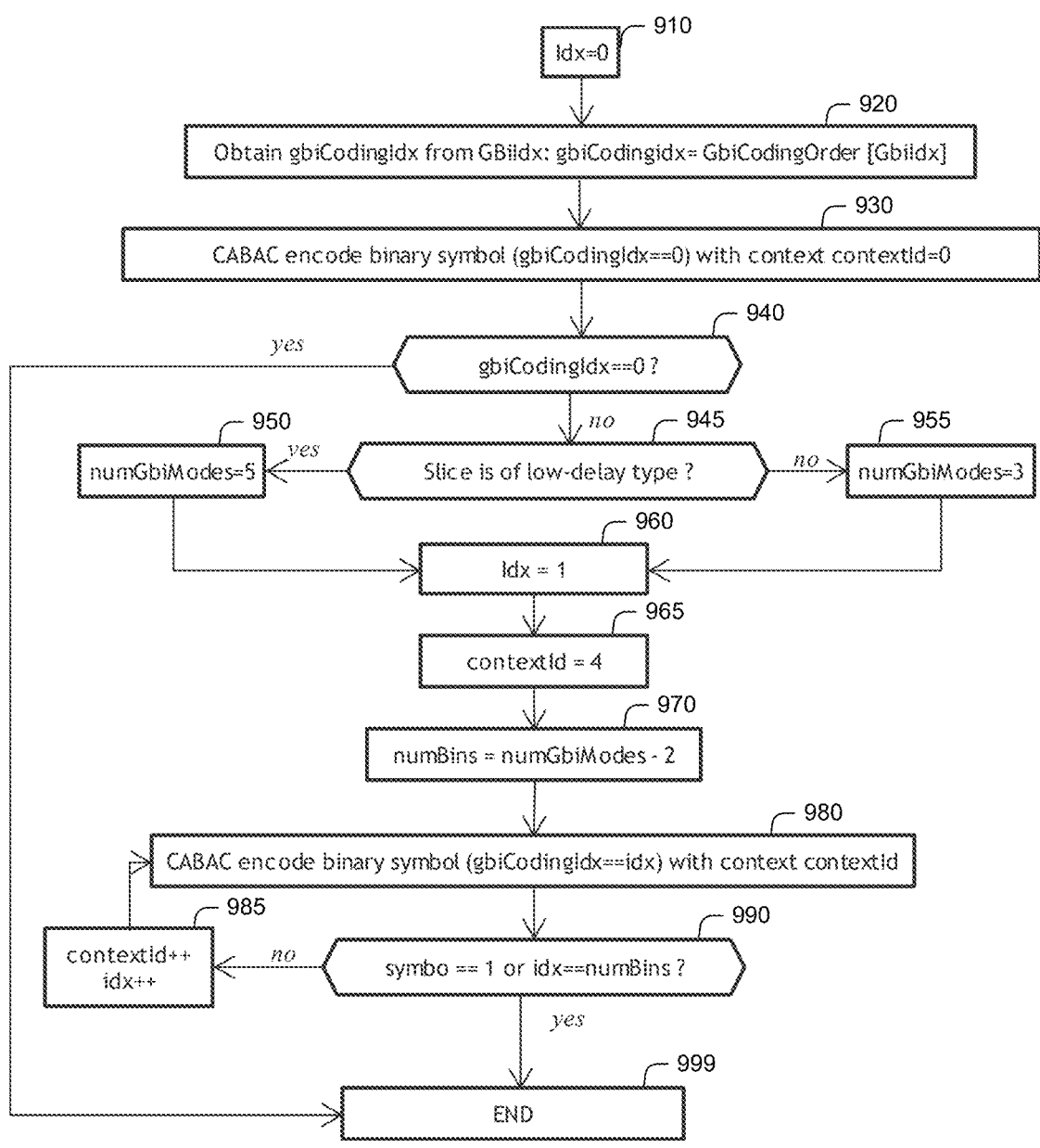
FIG. 9 illustrates a process of coding the GBi index in VVC draft 4.

FIG. 9 depicts the coding of the GBi index as in VVC draft 4. At step 910, a variable Idx is set to 0. At step 920, the GBiIdx value associated with the current CU is converted to gbiCodingIndex, through the table GbiCodingOrder defined by the column "gbiCodingIndex" of Table 1 and Table 2. At step 930, the flag (gbiCodingIndex==0) is encoded, which indicates if the value gbiCodingIndex is equal to zero. The zero value corresponds to the case the GBiIdx value of the current CU is equal to GBI_DEFAULT, which corresponds to the default bi-prediction mode, i.e., the case where w=4. If the value of gbiCodingIndex is zero (940), then the process is over.

Otherwise, the encoder checks (945) whether the slice is of the low-delay type. If the slice is of the low-delay type, numGbiModes is set (950) to 5; if the slice is not of the low-delay type, numGbiModes is set (955) to 3. At step 960, Idx is set to 1. At step 965, context model ID contextId is set to 4. At step 970, numBins is set to numGbiModes−2. The gbiCodingIndex is binarized into a bin string. The bins representing gbiCodingIndex are then encoded (980) one by one, with corresponding contextId (985), until all bins are encoded (990). The process ends at step 999.

Figure 10:
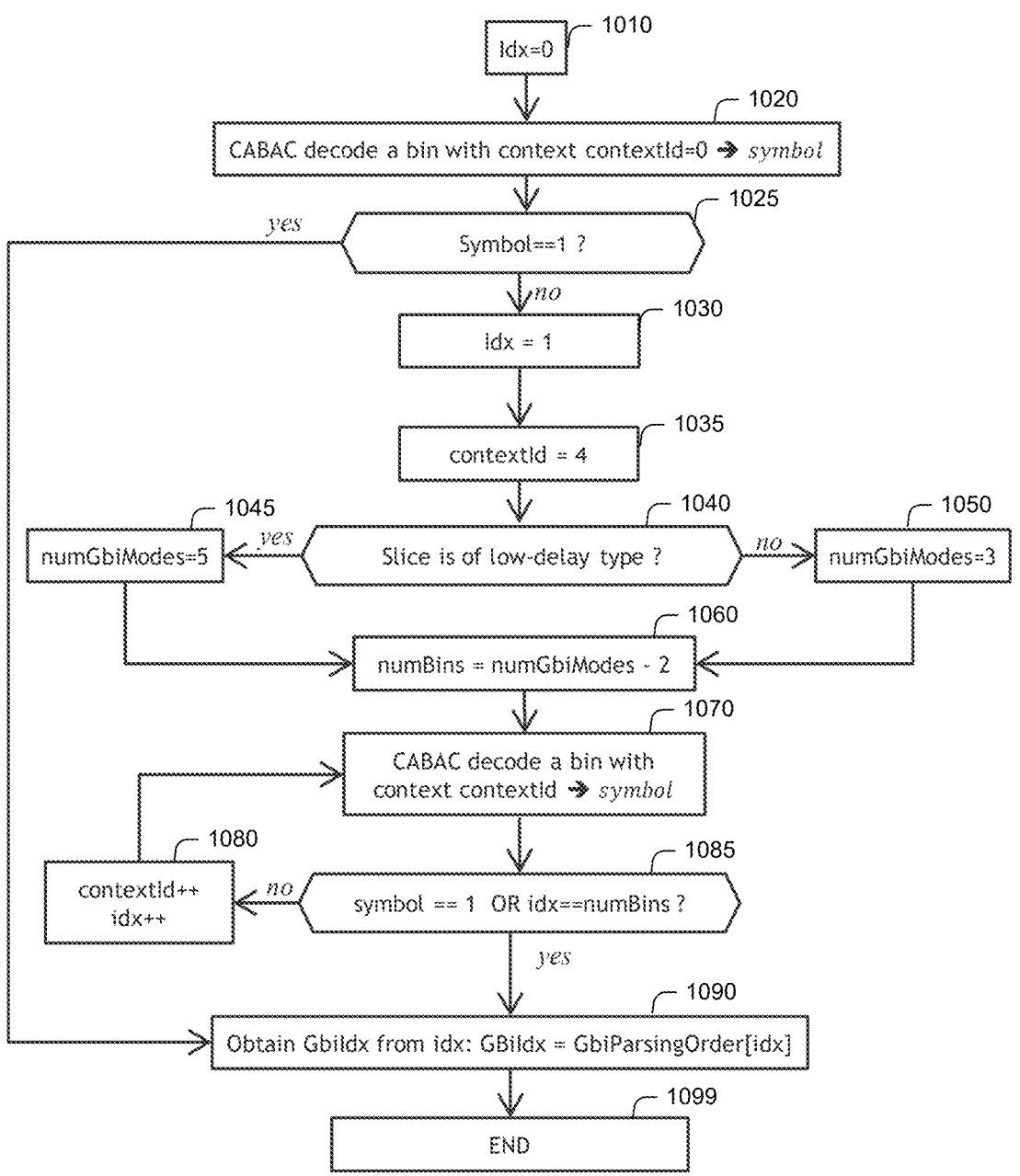
FIG. 10 illustrates a process of parsing the GBi index in VVC draft 4.

FIG. 10 depicts the parsing of the GBi index as in VVC draft 4. The decoder decodes a value "Idx" from the bit-stream, converts "Idx" to the actual GBiIdx associated with the input CU, using a mapping table GbiParsingOrder that links the decoded value Idx and the CU-level GBiIdx parameter.

More particularly, at step 1010, a variable Idx is set to 0. At step 1020, the flag indicating if the value gbiCodingIndex is equal to zero (gbiCodingIdx==0) is decoded, using con-textId=0. The zero value corresponds to the case the GBiIdx value of current CU is equal to GBI_DEFAULT, which corresponds to the default bi-prediction mode, i.e., the case where w=4. If the decoded symbol is 1, the decoder proceeds to step 1090.

Otherwise, if the flag is 1 (1025), at step 1030, Idx is set to 1. At step 1035, context model ID contextId is set to 4. The decoder checks (1040) whether the slice is of the low-delay type. If the slice is of the low-delay type, numGbi-Modes is set (1045) to 5; if the slice is not of the low-delay type, numGbiModes is set (1050) to 3. At step 1060, numBins is set to numGbiModes−2. The bins representing gbiCodingIndex are then decoded (1070) one by one itera-tively, with corresponding contextId (1080), until a bin symbol equal to 1 is found or numBins bins have been parsed (1085). At each iteration, the variable Idx is incre-mented. At step 1090, the "Idx" is converted to GBi index, through the table GbiParsingOrder. The process ends at step 1099.

Proposed GBi Index Coding Process (Encoder)

Table 3 and Table 4 illustrate proposed modifications to the GBi index (GBiIdx) coding for the low-delay mode and non-low-delay mode, respectively. In this proposed method, the first bin is encoded in the bypass mode (represented as "b" in the tables), and other bins are encoded in the regular mode.

TABLE 3

| | | | | | | | | |
|---|---|---|---|---|---|---|---|---|
| w | GBi Index | gbiCodingIndex | flag | Context | bin string | Contexts | gbiParsingOrder | |
| | | | | | | low-delay mode | | |
| −2 | 0 | 4 | 0 | [0] | 000 | [b, 5, 6] | 0 | |
| 3 | 1 | 2 | 0 | [0] | 01 | [b, 5] | 1 | |
| 4 | 2 | 0 | 1 | [0] | — | — | 2 | |
| 5 | 3 | 1 | 0 | [0] | 1 | [b, 5] | 3 | |
| 10 | 4 | 3 | 0 | [0] | 001 | [b, 5, 6] | 4 | |

TABLE 4

| | | | | | | | |
|---|---|---|---|---|---|---|---|
| w | GBi Index | gbiCodingIndex | flag | Context | bin string | Context | gbiParsingOrder |
| | | | | | | non-low-delay mode | |
| 3 | 1 | 2 | 0 | [0] | 0 | [b] | 1 |
| 4 | 2 | 0 | 1 | [0] | — | — | 2 |
| 5 | 3 | 1 | 0 | [0] | 1 | [b] | 3 |

Figure 11:
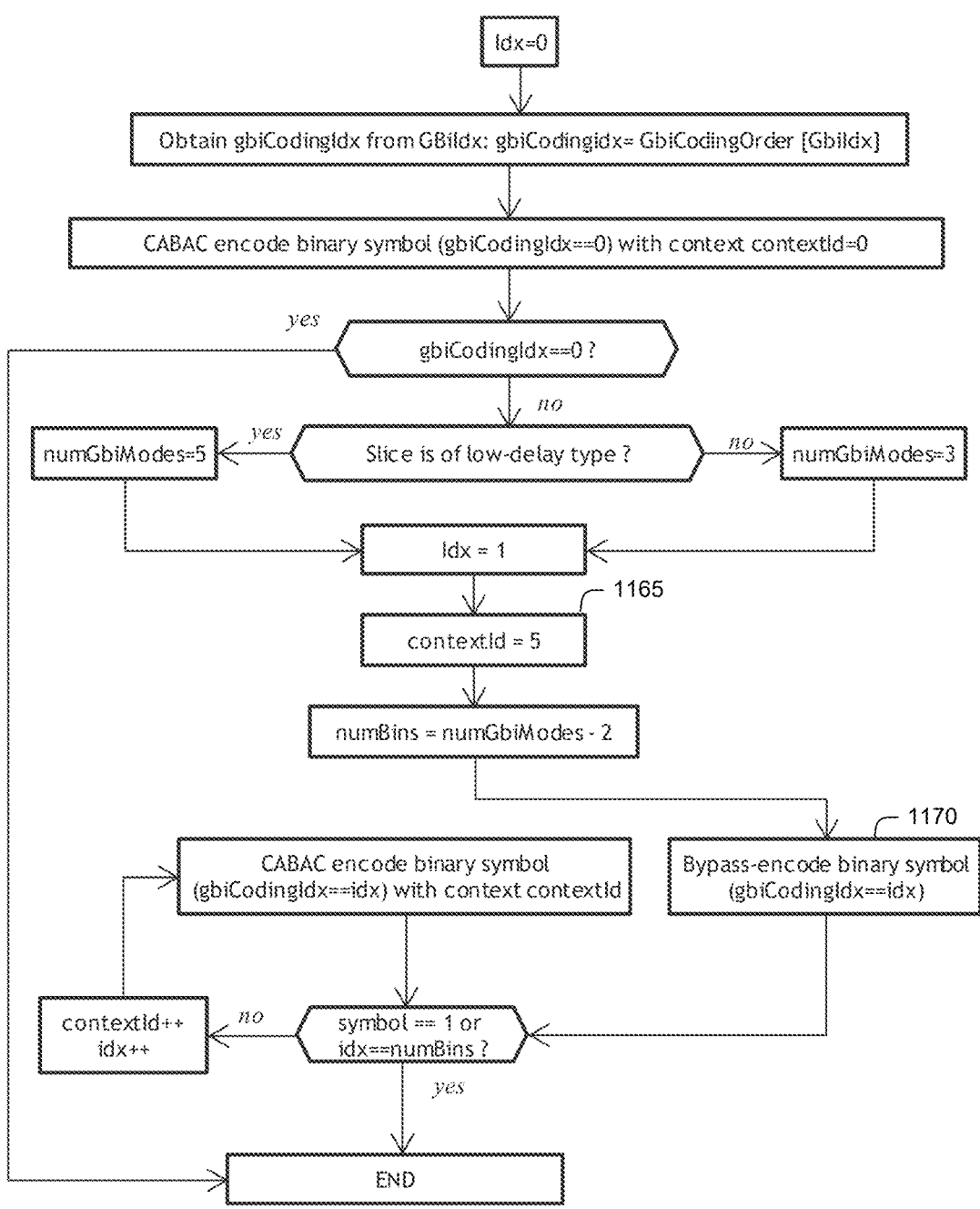
FIG. 11 illustrates a process of coding the GBi index, according to an embodiment.

FIG. 11 illustrates a proposed GBiIdx parameter coding process, according to an embodiment. At step 1165, contexId is set to 5. At step 1170, the first bin of the truncated Rice bin string of tables 3 or 4 is encoded in the bypass mode, instead of the context-based arithmetic coding mode. Other bins, if any, are encoded in the regular mode, similarly to those described in FIG. 9. The advantage of this proposed embodiment is reduced complexity in encoding the CU-level GBiIdx parameter.

Proposed GBi Parsing Process (Decoder)

Figure 12:
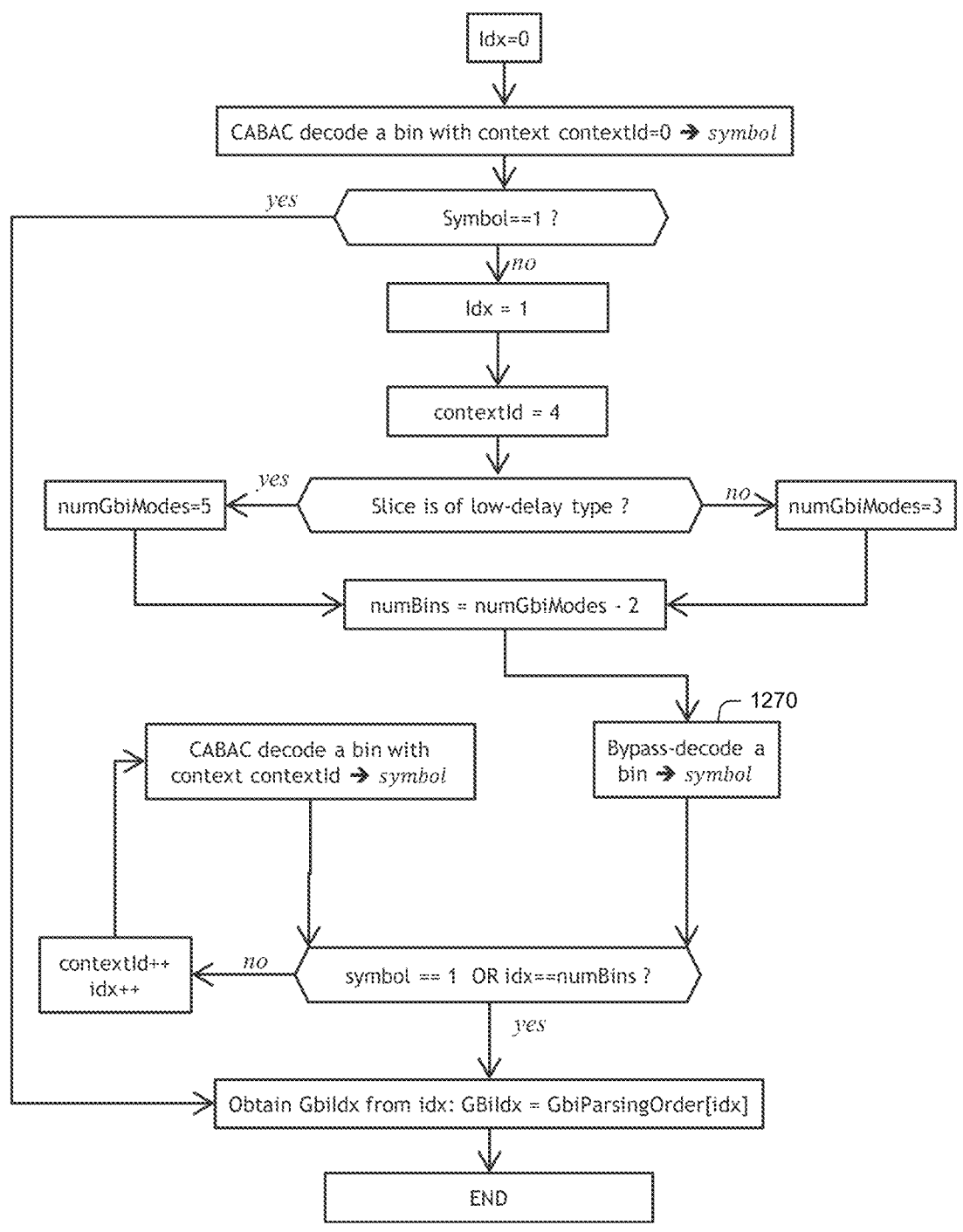
FIG. 12 illustrates a process of parsing the GBi index, according to an embodiment.

FIG. 12 illustrates a proposed modification to the GBiIdx parameter parsing process, according to an embodiment. As can be seen, the first steps of the proposed GBiIdx parsing process are the same as those described in FIG. 10. Next, in the case the first decoded symbol is equal to 0 (non GBI_DEFAULT base), then the series of bins representing the Truncated Rice binarized string is parsed. According to the proposed embodiment, the first bin of this string is parsed using the bypass mode, instead of the context-based arithmetic decoding mode. Other bins are decoded the same way as in the prior art. The advantage of this proposed embodiment is reduced complexity in parsing the GBiIdx CU-level parameter.

In the above, when an index is represented by multiple bins, the first bin is coded in the bypass mode, and the rest of the bins are encoded in the regular mode. More generally, more than one bins (at the beginnings of a bin string) can be encoded in the bypass mode, and the rest of bins are encoded in the regular modes. Also, the truncated Rice binarization is described in the above examples, it should be noted that the proposed coding methods can be applied to other binarization schemes. In addition, the GBi index is used as an example of a syntax element in the above. However, the methods as described above can be applied to other syntax elements.

Note that in encoding some other syntax elements, both the bypass mode and the regular mode are used, for example, when encoding the merge index as described before. In particular, to encode the merge index, the first bin is encoded in the regular mode, probably because it is more efficient to encode it with contextual information. For the rest of the bins, the probability may get more randomly distributed, and the bypass mode that corresponds to the equal probability may work just as well. It should be noted such encoding is opposite to what is proposed in the present embodiments, where the first bin is encoded in the bypass mode and the rest of the bins are encoded in the regular mode.

Figure 11A:
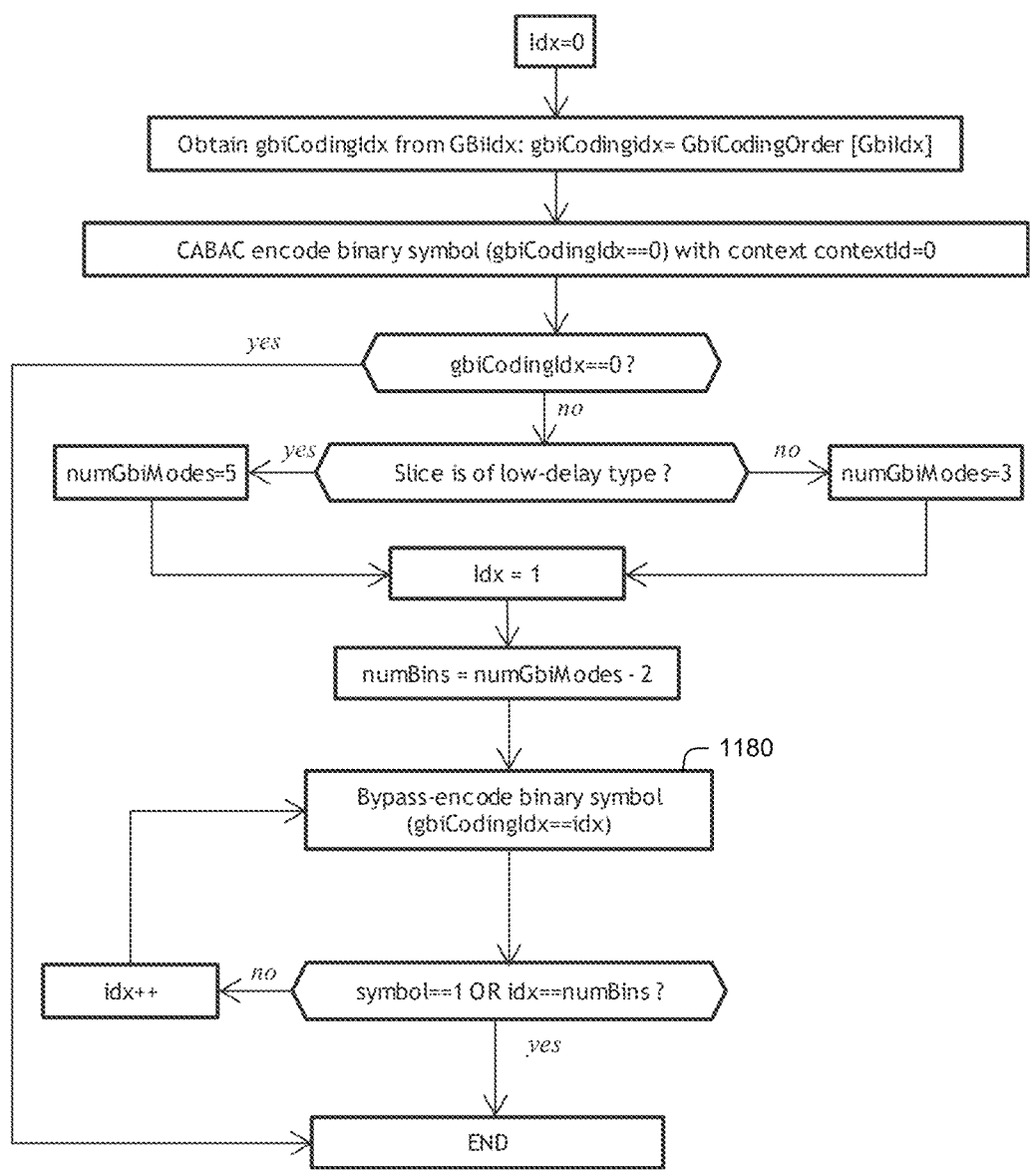
FIG. 11A illustrates a process of coding the GBi index, according to another embodiment.

According to another embodiment, only the first flag, which indicates if the default GBi index (GBI_DEFAULT) corresponding to the weighting factor w=4, is encoded in the regular mode. In this embodiment, all the bins of the truncated Rice bin string that follows that flag are encoded in the bypass mode. The advantage of this embodiment is further reduced complexity for the coding and the parsing of the GBi index, potentially at the cost of slightly reduced coding efficiency. FIG. 11A illustrates a proposed gbiCodingIndex coding process, according to this embodiment. At step 1180, the bins of the truncated Rice bin string of tables 3 or 4 are successively encoded in the bypass mode, instead of the context-based arithmetic coding mode. The advantage of this proposed embodiment is further reduced complexity in encoding the CU-level GBiIdx parameter, without any penalty in terms of video compression efficiency.

Figure 12A:
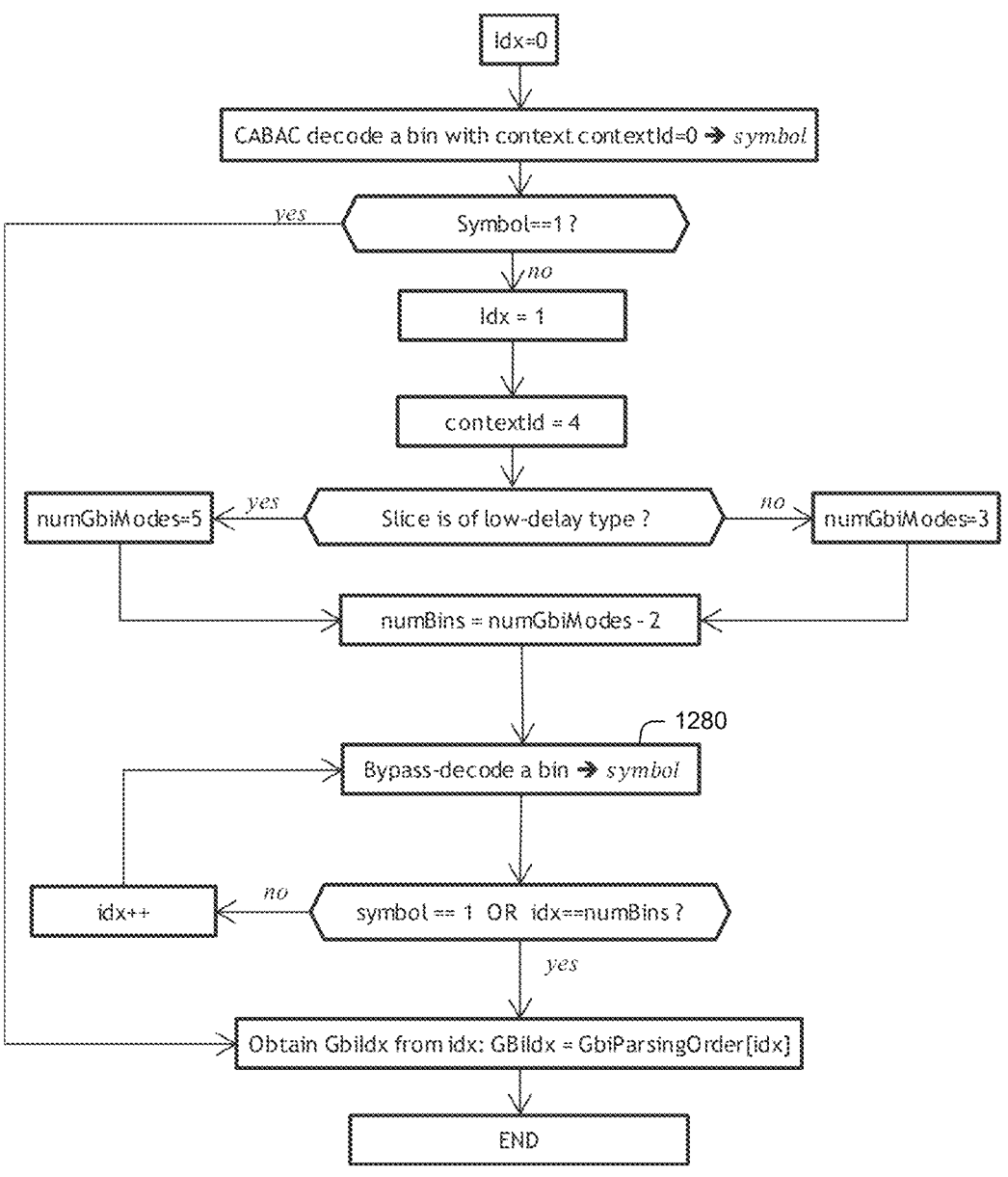
FIG. 12A illustrates a process of parsing the GBi index, according to another embodiment.

FIG. 12A illustrates a proposed modification to the gbiCodingIndex parsing process, according to this embodiment. As can be seen, the first steps of the proposed gbiCodingIndex parsing process are the same as those described in FIG. 10. Next, in the case the first decoded symbol is equal to 0 (non GBI_DEFAULT case), then the series of bins representing the Truncated Rice binarized string is parsed. According to the proposed embodiment, the bins of this string are parsed using the bypass mode (1280), instead of the context-based arithmetic decoding mode.

Table 4A depicts the compression performance of VTM-4.0 when using this proposed embodiment (as described in FIG. 11A, FIG. 12A) for the gbiCodingIndex coding, compared to the performances of VTM-4.0 with the gbiCodingIndex coding method of FIG. 9, coupled with the gbiCodingIndex parsing method of FIG. 10. The numbers provided in the table correspond to the average bitrate reduction of the proposed method, at same objective video quality. Thus, a negative number indicates a bitrate reduction, hence a better coding efficiency, while a positive number indicates a bitrate increase, hence a decreased coding efficiency. The Y, U and V columns respectively correspond to the luma, chroma Cb and chroma Cr components. It can be seen that this embodiment leads to no average bitrate modification in Luma compared to the method of FIG. 9, hence does not introduce any penalty in video compression efficiency, despite the reduced complexity due to the use of more bypass coded bins.

TABLE 4A

Compression performance of the proposed embodiment (FIG. 11A, FIG. 12A) for GBi index coding and parsing

| | Random Access Main 10 | | | Low delay B Main10 | | |
| | Y | U | V | | Y | U | V |
|---|---|---|---|---|---|---|---|
| Class A1 | −0.01% | −0.03% | 0.01% | Class A1 | | | |
| Class A2 | −0.01% | −0.02% | 0.06% | Class A2 | | | |
| Class B | 0.01% | −0.02% | 0.02% | Class B | 0.01% | −0.14% | 0.05% |
| Class C | 0.00% | −0.05% | 0.00% | Class C | −0.03% | 0.23% | 0.05% |
| Class E | | | | Class E | 0.01% | 0.30% | −0.33% |
| Overall | 0.00% | −0.03% | 0.02% | Overall | 0.00% | 0.09% | −0.05% |
| Class D | 0.01% | −0.04% | −0.06% | Class D | 0.00% | 0.11% | −0.31% |
| Class F (optional) | 0.00% | −0.02% | −0.02% | Class F (optional) | −0.03% | 0.07% | 0.14% |

In the following, it is explained why the proposed gbiCodingIndex coding and parsing method has no loss in coding efficiency, namely, the bypass coding of the bins issued from the Truncated Rice (TR) bin string happens to be as efficient as the arithmetic coding of these bins.

It is known that arithmetic coding achieves a bitrate very close the Shannon limit, i.e. the entropy of the symbols it encodes, thus is an optimal or near-optimal entropy coding method.

The optimality of the bypass coding part of the process implies that binarization used to code the gbiCodingIndex closely corresponds to a Huffman tree. This means the TR binarization for coding the bins of the gbiCodingIndex in the bypass mode corresponds to a Huffman tree. Huffman coding is an optimal variable length coding method. Moreover, it is known that Huffman coding generates an average code length equal to the entropy of the signaled bins, when certain conditions are fulfilled. In particular, a Huffman coding is optimal if the probabilities associated to each branch of the Huffman tree is dyadic, i.e., is equal to a negative power of two: $\frac{1}{2}^n$ where n is a positive integer value.

Figure 12B:
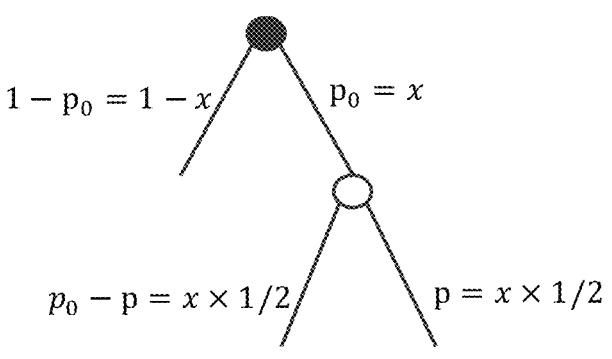
FIG. 12B and FIG. 12C illustrate the gbiCodingIndex binarization and coding/parsing process, in the non-low-delay mode and in the low-delay mode, respectively.
Figure 12C:
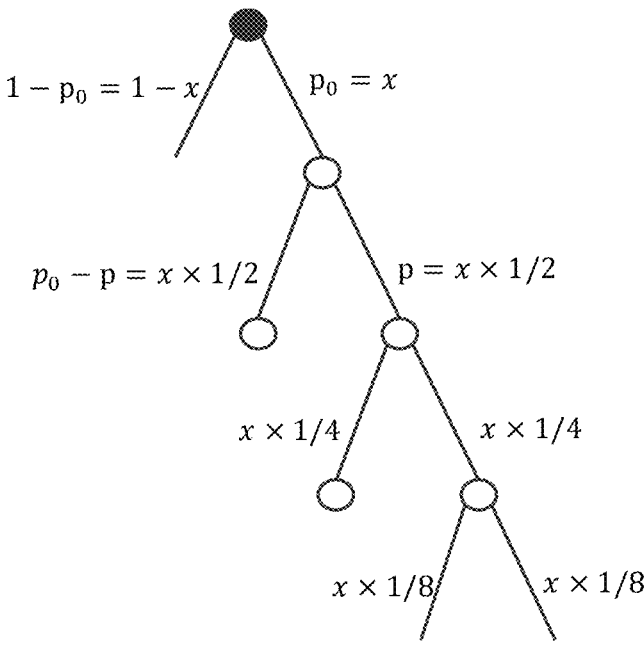

The two trees in FIG. 12B and FIG. 12C illustrate the gbiCodingIndex binarization and coding/parsing process, which result from the proposed solution, in non-low-delay mode and in low delay inter picture coding configurations respectively. The filled nodes correspond to regular (context-based) coded bins, and the non-filled nodes correspond to bypass coded bins. Let x be the probability that the context-based coded bin is equal to 0. The values associated to each edge of the trees of FIG. 12B and FIG. 12C correspond to the probabilities that the bins of the binarized gbiCoding-Index are equal to 1 or 0. For instance, the probability that the second bin of the binarized gbiCodingIndex is equal to 0 is $$x \times \frac{1}{2}$$

and the probability that this bin is equal to 1 is also $$x \times \frac{1}{2}.$$

Figure 12D:
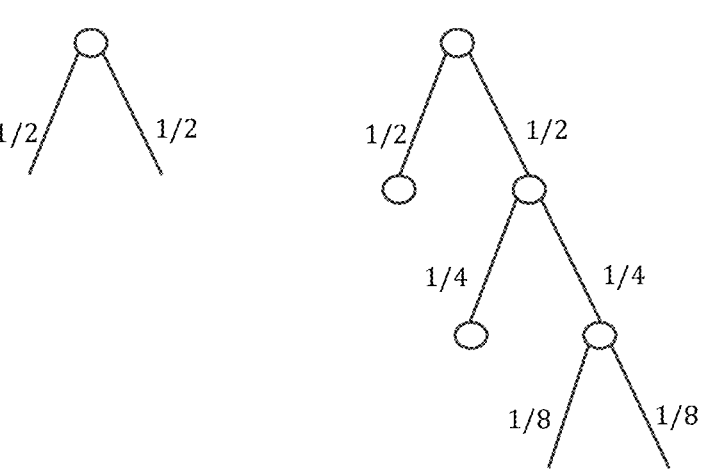
FIG. 12D illustrates the trees when the first bin that signals the default GBI mode is equal to 0.

FIG. 12D illustrates a tree that corresponds to the coding/parsing of the bypass coded bins of the binarized gbiCodingIndex, knowing that the first bin that signals the default GBI mode is equal to 0. As already explained, the optimality of the bypass coding of these bins indicates that the tree of FIG. 12D is a Huffman coding tree that is optimal, hence with dyadic associated probability values.

The probabilities of a bin string resulting from a truncated Rice (TR) binarization of a syntax element are not always dyadic. For example, there exists some other syntax elements in the VVC specification, which are binarized following the Truncated Rice binarization, and where all the bins are being context-based coded, such as syntax elements last_sig_coeff_x_prefix and last_sig_coeff_y_prefix. These two parameters are truncated Rice binarized and all bins are context-based coded. Bypass coding a part of them would lead to a loss in compression efficiency, which shows the corresponding bypass coding would not correspond to an optimal Huffman coding process, with dyadic probability distribution of the bypass coded bins.

In this embodiment, we recognize that the probabilities of the bin string of gbiCodingIndex after the TR binarization are close to dyadic and thus applying the bypass coding pass would correspond to the optimal Huffman coding process, while incurring a lower computational complexity than arithmetic coding in the regular mode.

Signaling of the Motion Vector Predictor

Motion Vector Predictive Coding in AMVP Mode in VVC Draft 4

The AMVP motion vector coding mode relates to coding the motion vector of a CU using the following elements:

The inter prediction direction, which indicates if bi-prediction or uni-prediction is used to predict current CU, and which reference picture list is used in case of uni-prediction.

The reference picture index(es) which indicates which reference picture(s) is/are used to predict the current CU, in each involved reference picture list.

The motion vector predictor used to predict the actual motion vector of the current CU for each reference picture used to predict the current CU. This MV predictor (or MVP, or AMVP candidate) is chosen by the encoder in a MV predictor list containing two candidates. Which MV candidate is selected is signaled through a flag, respectively noted mvp_l0_flag and mvp_l1_flag, for each concerned reference picture list L0 and L1.

The motion vector differences between the actual motion vectors of the current CU and their respective motion vector predictors, for each reference picture list L0 and L1.

Figure 13:
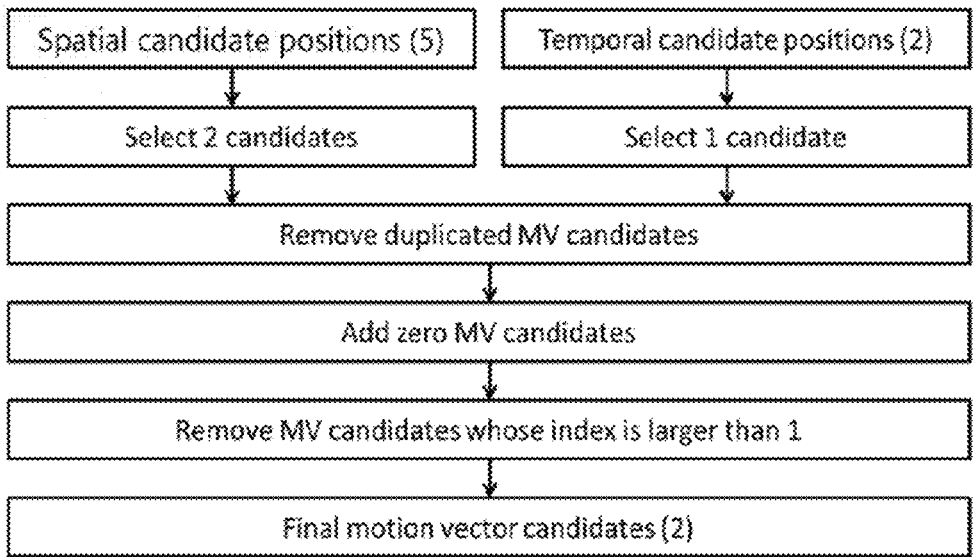
FIG. 13 is a pictorial example illustrating motion vector predictor candidate list construction in the AMVP mode.
Figure 14:
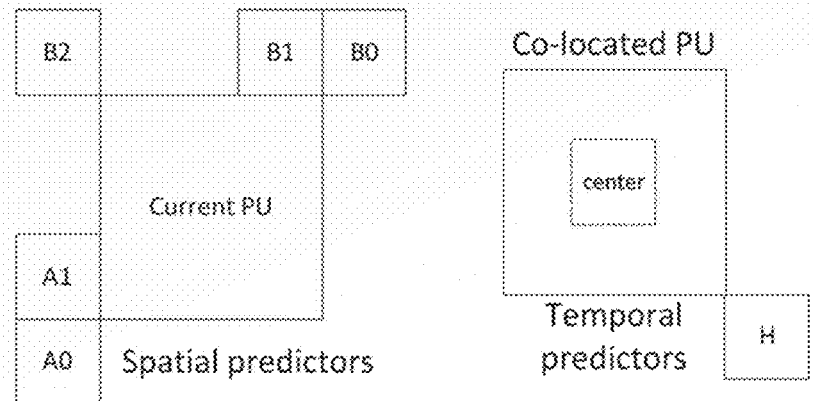
FIG. 14 is a pictorial example illustrating spatial and temporal motion vector prediction candidates considered to construct the AMVP candidate list.

The construction of the AMVP motion vector prediction candidate list is illustrated in FIG. 13 and FIG. 14. This process basically consists in selecting at most two spatial candidates among five spatial positions around the current CU, then pruning them and keeping at most two of them. Next, a temporal MV prediction candidate is sought, in the so-called collocated slice of the current slice, at spatial positions corresponding to the bottom right position H, or, if not available, at center position 'center'. Next, a pruning process is applied between spatial and temporal candidates, and the list is filled with zero motion vectors up to two elements overall. In the end, the AMVP candidate list contains exactly two motion vector prediction candidates.

Thus, a single flag, respectively noted mvp_l0_flag and mvp_l1_flag is signaled in the bitstream, and parsed on the decoder side, in order to indicate which AMVP candidate, among the two elements contained in the AMVP list, is used to predict the current CU's motion vector in each reference picture list L0 and L1.

Figure 15:
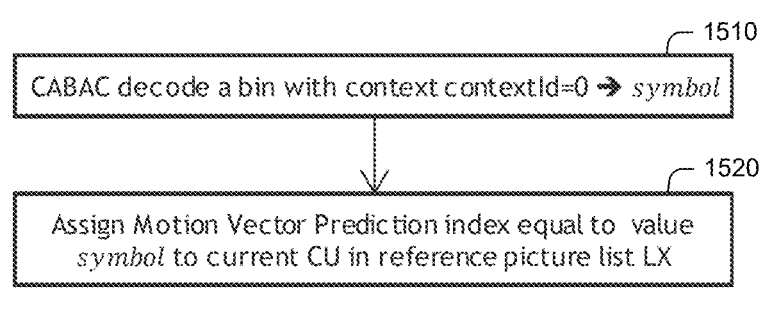
FIG. 15 illustrates CABAC coding of the motion vector prediction index in AMVP in VVC draft 4.

The process to parse the flag mvp_l0_flag or mvp_l1_flag, depending on the considered reference picture list L0 or L1, is illustrated in FIG. 15. It consists in the context-based arithmetic decoding (1510) of a binary symbol 'symbol'. This employs a single CABAC context. The MV predictor index of the current PU or CU in the considered reference picture list is given (1520) the value of the decoded symbol (a PU may be a motion partition inside current CU, as is used in HEVC; in VVC draft 4 no PU partitioning is used, so a PU correspond to a CU).

Proposed Method: Coding the Mvp_l0_Flag and Mvp_l1_Flag in Bypass Mode

It has been measured that over multiple coded video sequences, the average entropy used to CABAC signal the mvp_l0_flag and mvp_l1_flag syntax element is very close to one bit of information, which means that no benefit is brought by the CABAC coding of these flag, compared to a simple bypass coding process.

Figure 16:
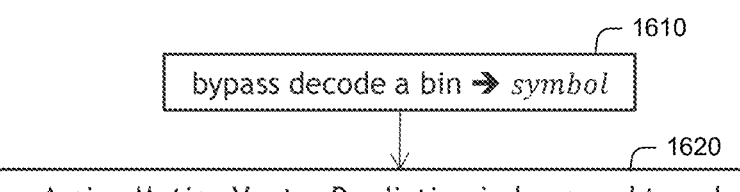
FIG. 16 illustrates a process of bypass coding the mvp_l0_flag and mvp_l1_flag syntax elements, according to an embodiment.

In the present embodiment, it is thus proposed to encode and parse these flags through the bypass coding mode. FIG. 16 illustrates the proposed parsing process to decode (1610, 1620) the MV predictor index of one CU or PU, for one given reference picture list. The difference from the process of FIG. 15 is that the CABAC decoding of the concerned bin is replaced by a bypass decoding (1610) of this bin. On the encoder side, the binary symbol representing the mvp_l0_flag or mvp_l1_flag is encoded in the bypass mode. The advantage of this embodiment is reduced complexity in the coding and the parsing process of VVC, with negligible impact on the coding efficiency.

According to a further embodiment, the mvp_l0_flag may be coded in a different way according to whether the considered CU is coded in SMVD (Symmetrical Motion Vector Difference) mode or not. The SMVD motion vector coding process of VVC consists in coding the motion vector difference of a given CU with regards to the first reference picture list L0. Then the motion vector difference of the considered CU in the other reference picture list (L1) is deduced from the L0 motion vector difference. Indeed, in this mode, the two motions vector are symmetrical. The L1 motion vector is equal to the opposite of the L0 motion vector, in both components. In this embodiment, the MVP candidate in the SMVD case may be encoded in the regular mode, while the MVP candidate in the traditional AMVP motion vector coding mode may be coded in the bypass mode. This means two separate syntax elements may be specified, the classical mvp_l0_flag and the smvd_mvp_l0 flag, the latter being used to specify the MV used to predict the motion vector of a CU in SMVD mode.

According to another embodiment, the classical mvp_l0_flag may be coded in the regular mode, while the smvd_mvp_l0 flag may be coded in the bypass mode. According to a variant, the classical mvp_l0_flag may be coded in the regular mode, and the smvd_mvp_l0 flag may be coded also in the regulr mode, but with a separate context from the CABAC context used to code the usual mvp_l0_flag.

Using the VVC draft 4 syntax as examples, Table 5 lists an example of modifications brought to the syntax by the method proposed above. In particular, the descriptor for syntax elements mvp_l0_flag and mvp_l1_flag is changed from ae(v) to u(1), where ae(v) indicates a context-adaptive arithmetic entropy-coded syntax element, and u(n) indicates an unsigned integer using n bits.

TABLE 5

| coding_unit( x0, y0, cb Width, cbHeight, treeType ) { | Descriptor |
|---|---|
| ... | |
|   } else if( treeType != DUAL_TREE_CHROMA ) { /* MODE INTER or MODE IBC */ | |
|     if( cu_skip_flag[ x0 ][ y0 ] = = 0 ) | |
|       merge_flag[ x0 ][ y0 ] | ae(v) |
|     if( merge_flag[ x0 ][ y0 ] ) { | |
|       merge_data( x0, y0, cbWidth, cbHeight ) | |
|     } else if ( CuPredMode[ x0 ][ y0 ] = = MODE_IBC ) { | |
|       mvd_coding( x0, y0, 0, 0 ) | |
|       ~~mvp_l0_flag[x0][y0]~~ | ~~ae(v)~~ |
|       <u>mvp l0 flag[ x0 ][ y0 ]</u> | <u>u(1)</u> |
|       if( sps_amvr_enabled_flag && | |
|         ( MvdL0[ x0 ][ y0 ][ 0 ] != 0 \| \| MvdL0[ x0 ][ y0 ][ 1 ] != 0 ) ) { | |
|         amvr_precision_flag[ x0 ][ y0 ] | ae(v) |
|       } | |
|     } else { | |
|       if( tile_group_type = = B ) | |
|         inter_pred_idc[ x0 ][ y0 ] | ae(v) |
|       if( sps_affine_enabled_flag && cbWidth >= 16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |
|       if( inter_pred_idc[ x0 ][ y0 ] == PRED_BI && !inter_affine_flag[ x0 ][ y0 ] && | |
|         RefIdxSymL0 > −1 && RefIdxSymL1 > −1 ) | |
|         sym_mvd_flag[ x0 ][ y0 ] | ae(v) |
|       if( inter_pred_idc[ x0 ][ y0 ] != PRED_L1 ) { | |
|         if( NumRefIdxActive[ 0 ] > 1 && !sym_mvd_flag[ x0 ][ y0 ] ) | |
|           ref_idx_l0[ x0 ][ y0 ] | ae(v) |
|         mvd_coding(x0, y0, 0, 0 ) | |
|         if( MotionModelIdc[ x0 ][ y0 ] > 0 ) | |

TABLE 5-continued

```
            mvd_coding(x0, y0, 0, 1 )
        if(MotionModelIdc[ x0 ][ y0 ] > 1 )
            mvd_coding(x0, y0, 0, 2 )
        mvp_l0_flag[x0][y0]                                                    ae(v)
        mvp_l0_flag[ x0 ][ y0 ]                                                u(1)
    } else {
        MvdL0[ x0 ][ y0 ][ 0 ] = 0
        MvdL0[ x0 ][ y0 ][ 1 ] = 0
    }
    if( inter_pred_idc[ x0 ][ y0 ] != PRED_L0 ) {
        if( NumRefIdxActive[ 1 ] > 1 && !sym_mvd_flag[ x0 ][ y0 ] )
            ref_idx_l1[ x0 ][ y0 ]                                            ae(v)
        if( mvd_l1_zero_flag && inter_pred_idc[ x0 ][ y0 ] = = PRED_BI ) {
            MvdL1[ x0 ][ y0 ][ 0 ] = 0
            MvdL1[ x0 ][ y0 ][ 1 ] = 0
            MvdCpL1[ x0 ][ y0 ][ 0 ][ 0 ] = 0
            MvdCpL1[ x0 ][ y0 ][ 0 ][ 1 ] = 0
            MvdCpL1[ x0 ][ y0 ][ 1 ][ 0 ] = 0
            MvdCpL1[ x0 ][ y0 ][ 1 ][ 1 ] = 0
            MvdCpL1[ x0 ][ y0 ][ 2 ][ 0 ] = 0
            MvdCpL1[ x0 ][ y0 ][ 2 ][ 1 ] = 0
        } else {
            if( sym_mvd_flag[ x0 ][ y0 ] ) {
                MvdL1[ x0 ][ y0 ][ 0 ] = −MvdL0[ x0 ][ y0 ][ 0 ]
                MvdL1[ x0 ][ y0 ][ 1 ] = −MvdL0[ x0 ][ y0 ][ 1 ]
            } else
                mvd_coding( x0, y0, 1, 0 )
        }
        if( MotionModelIdc[ x0 ][ y0 ] > 0 )
            mvd_coding( x0, y0, 1, 1)
        if(MotionModelIdc[ x0 ][ y0 ] > 1 )
            mvd_coding( x0, y0, 1, 2 )
        mvp_l1_flag[x0][y0]                                                    ae(v)
        mvp_l1_flag[ x0 ][ y0 ]                                                u(1)
    } else {
        MvdL1[ x0 ][ y0 ][ 0 ] = 0
        MvdL1[ x0 ][ y0 ][ 1 ] = 0
    }
}
. . .
```

Table 6 shows the performance results obtained with the complexity reduction aspects proposed above. It can be seen that almost no change in the compression efficiency from the proposed simplifications.

TABLE 6

| | Random Access Main 10 Over VTM-2.0.1 | | |
| --- | --- | --- | --- |
| | Y | U | V |
| Class A1 | 0.01% | 0.01% | −0.07% |
| Class A2 | 0.00% | 0.02% | 0.02% |
| Class B | 0.02% | 0.06% | 0.06% |
| Class C | 0.00% | 0.01% | 0.05% |
| Class E | | | |
| Overall | 0.01% | 0.03% | 0.02% |
| Class D | 0.02% | 0.09% | −0.02% |
| Class F (optional) | 0.04% | 0.10% | 0.19% |

Figure 17:
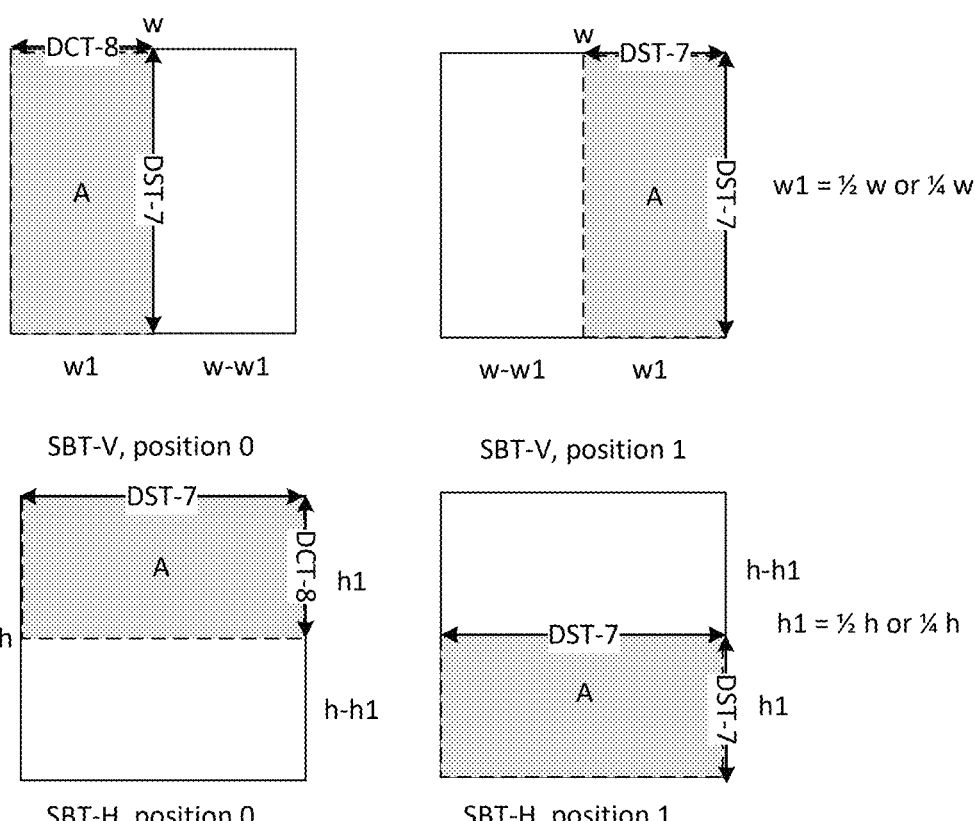
FIG. 17 illustrates the principle of the SBT tool in VVC draft 5.

In the above, examples are described with respect to VVC draft 4. In the following, several examples, including the signaling of inter sub-block transform, intra sub-partition (ISP) coding mode, multiple reference line intra prediction, and SMVD (symmetrical motion vector difference) inter tool, are described with respect to VVC draft 5 (see "Versatile Video Coding (Draft 5)", B. Bross et al., 14th JVET meeting, Mar. 19-27, 2019, Geneva, CH).
Signaling of Sub-Block Transform
  Sub-block transform (SBT) in VVC draft 5
  For an inter-predicted CU which is signaled as a non-zero residual block, the SBT tool splits the CU into 2 transform units (TU) in a binary fashion. One of the two resulting TU has non-zero residual, and the other one has only zero residual data. The binary split applied may be symmetric or asymmetric. In case of symmetric split, the two resulting TU have equal size, which is half the size of the CU in the orientation of the split. In case of asymmetric binary split, one TU has a size equal to ¼ or the parent CU along the splitting orientation, and the other TU size is ¾ the size of the CU along the split orientation.
  In addition to the spatial division, the TU with non-zero residual is coded with inferred adaptive transform. The 1D transforms used depend on the position of the non-zero residual TU, as illustrated in FIG. 17, where portion "A" is the TU with non-zero residual data and the other TU has only zero residual data.
  The TU splitting of the considered coding unit is signaled through 3 flags. First, the cu_sbt_flag indicates the use of SBT for the considered CU. Next, in case SBT is used, the SBT type and the SBT position information is signaled. This takes the form of the following three coded flags:
  The cu_sbt_quad_flag indicates the use of asymmetric binary split. It is coded if both symmetric and asymmetric splits are allowed for the current CU.
  The cu_sbt_horizontal_flag indicates the orientation of the binary split. It is coded if both horizontal and vertical splits are allowed for the current CU, and for the previously signaled SBT split type (asymmetric or not).
  The cu_sbt_pos_flag indicates the position of the non-zero residual TU used to code the texture data of the considered CU.
  In VVC draft 5, the four above flags are context-based coded. The part of VVC specification corresponding to this aspect is shown in Table 7.

TABLE 7

Assignment of CABAC contexts to syntax elements with context coded bins in
VVC draft 5 (truncated table 9-14 of document JVET-N1001)

| Syntax element | binIdx | | | | | |
| | 0 | 1 | 2 | 3 | 4 | >= 5 |
|---|---|---|---|---|---|---|
| . . . | . . . | . . . | . . . | . . . | . . . | . . . |
| cu_sbt_flag | ( cbWidth * cbHeight < 256) ? 1 : 0 | na | na | na | na | na |
| cu_sbt_quad_flag | 0 | na | na | na | na | na |
| cu_sbt_horizontal_flag | ( cbWidth = = cbHeight) ? 0 : ( cbWidth < cbHeight )? 1 : 2 | na | na | na | na | na |
| cu_sbt_pos_flag | 0 | na | na | na | na | na |
| . . . | . . . | . . . | . . . | . . . | . . . | . . . |

FIG. 18 illustrates the decoding process of the SBT mode as specified in VVC draft 5. At step 1810, the context id to decode cu_sbt_flag is obtained as ctxId=(width*height) <=256 ?1:0. Then at step 1820, the binary symbol cu_sbt_ flag is CABAC decoded with the context ctxId. If cu_sbt_ flag equals 0 (1830), the sub-block transform tool is not used. Otherwise, if cu_sbt_flag is not 0, the binary symbol cu_sbt_quad_flag is CABAC decoded with the context ctxId=0 at step 1840. At step 1850, the decoder checks whether vertical and horizontal split is allowed for the current CU. If yes, the context id to decode cu_sbt_hori-zontal_flag is obtained as ctxId=(cuWidth==cuHeight)?0: (cuWidth<cuHeight?1:2) at step 1860. Then at step 1870, the binary symbol cu_sbt_horizontal_flag is CABAC decoded with the context ctxId. At step 1880, the binary symbol cu_sbt_pos_flag is CABAC decoded with the con-text ctxId=0. The process ends at step 1899.

Simplified Coding of the SBT Mode

According to an embodiment proposed, the 'cu_sbt_pos_ flag' is coded in the bypass mode instead of the regular (context-based) CABAC mode. Indeed, it happens that this simplified coding of the 'cu_sbt_pos_flag' has negligible impact on the overall codec coding efficiency, while sim-plifying the entropy coding.

According to another embodiment, the 'cu_sbt_quad_ flag' is coded in the bypass mode rather than in the regular mode. This simplification also happens to impact the codec performance in a negligible way.

According to another embodiment, both 'cu_sbt_pos_ flag' and 'cu_sbt_quad_flag' are coded in the bypass mode instead of the regular mode.

According to another embodiment, the 'cu_sbt_horizon-tal_flag' is coded in the bypass mode rather than in the regular mode. This simplification also happens to impact the codec performance in a negligible way.

According to another embodiment, the three flags, 'cu_sbt_pos_flag', 'cu_sbt_quad_flag' and 'cu_sbt_horizon-tal_flag' are coded in the bypass mode instead of the regular mode. Almost no loss in coding efficiency results from this overall modification, as is shown by the simulation results in Table 8.

TABLE 8 coding efficiency over VTM-5.0 (VVC draft 5 reference software)

| | Random Access Main 10 Over VTM-2.0.1 | | | | |
| | Y | U | V | EncT | DecT |
|---|---|---|---|---|---|
| Class A1 | 0.02% | −0.17% | 0.09% | 97% | 102% |
| Class A2 | 0.01% | −0.02% | 0.07% | 99% | 104% |
| Class B | 0.02% | 0.01% | −0.01% | 94% | 101% |
| Class C | 0.01% | −0.17% | −0.13% | 94% | 94% |
| Class E | | | | | |
| Overall | 0.01% | −0.08% | −0.01% | 96% | 100% |
| Class D | 0.02% | −0.12% | 0.24% | 97% | 91% |
| Class F (optional) | 0.03% | 0.02% | 0.01% | 98% | 97% |

Figure 19A:
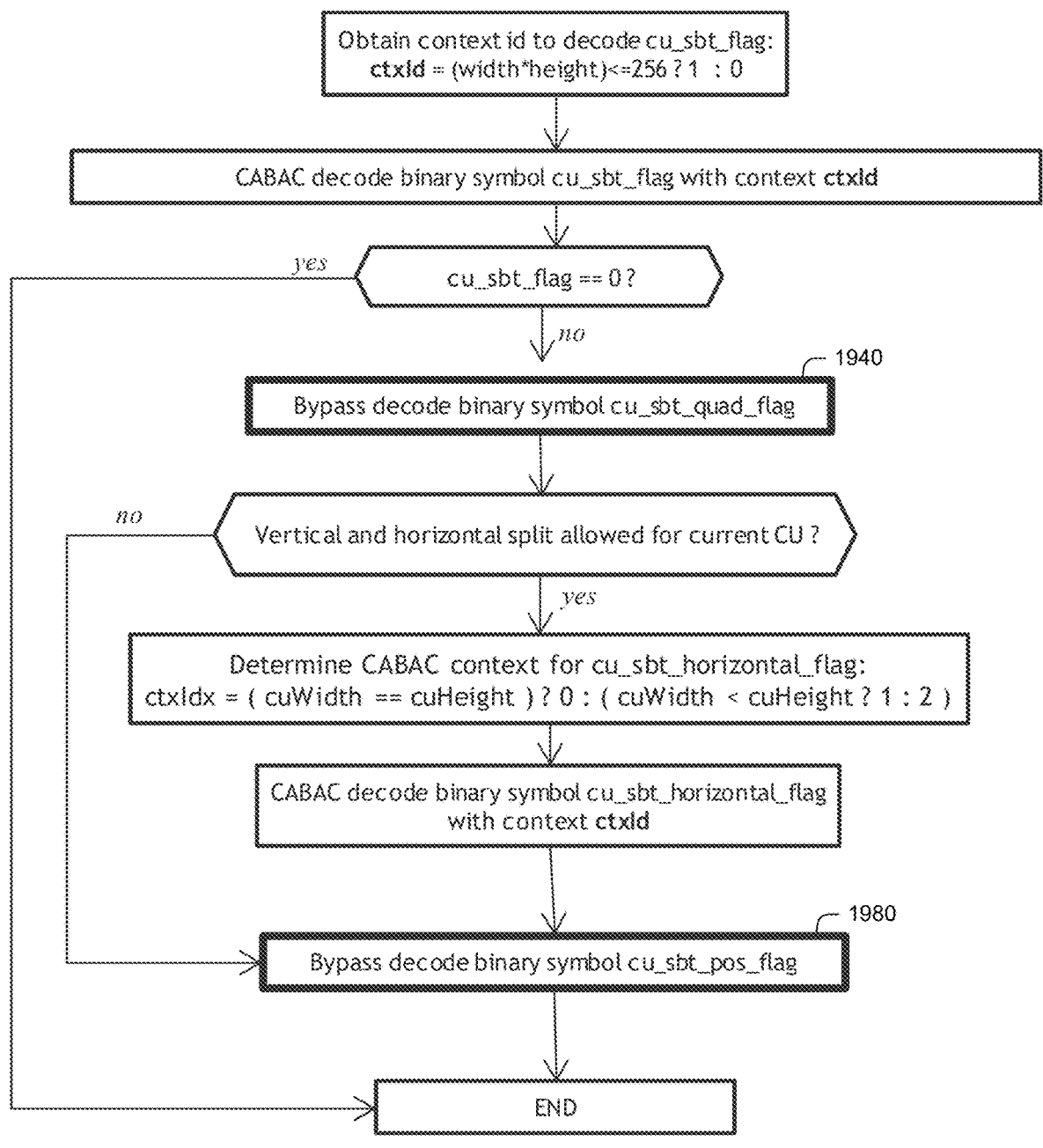
FIG. 19A illustrates a SBT mode decoding process, according to an embodiment.
Figure 19B:
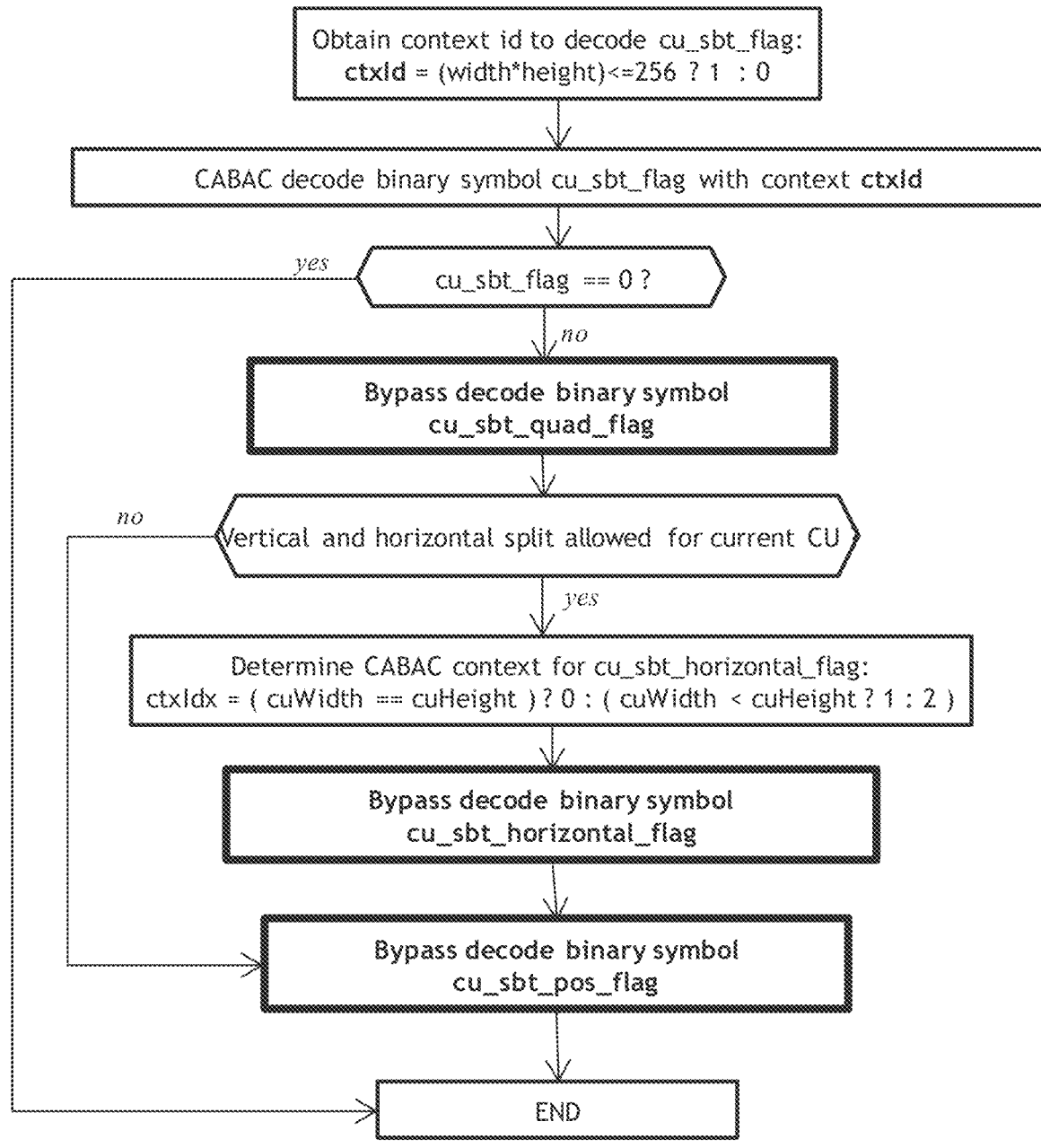
FIG. 19B illustrates a SBT mode decoding process, according to another embodiment.

FIG. 19A illustrates the decoding process, according to the embodiment where both 'cu_sbt_pos_flag' and 'cu_sbt_quad_flag' are coded (1940, 1980) in the bypass mode. FIG. 19B illustrates the decoding process, according to the embodiment where the three flags, 'cu_sbt_pos_flag', 'cu_sbt_quad_flag' and 'cu_sbt_horizontal_flag' are coded in the bypass mode.

TABLE 9 modification to VVC draft 5

| Syntax element | binIdx | | | | | |
| | 0 | 1 | 2 | 3 | 4 | >= 5 |
|---|---|---|---|---|---|---|
| . . . | . . . | . . . | . . . | . . . | . . . | . . . |
| cu_sbt_flag | ( cbWidth * cbHeight<256) ? 1 : 0 | na | na | na | na | na |
| cu_sbt_quad_flag | bypass | na | na | na | na | na |
| cu_sbt_horizontal_flag | ( cbWidth = = cbHeight) ? 0 : ( cb Width < cbHeight) ? 1 : 2 | na | na | na | na | na |
| cu_sbt_pos_flag | bypass | na | na | na | na | na |
| . . . | . . . | . . . | . . . | . . . | . . . | . . . |

The normative syntax specification of VVC draft 5 can be modified as shown in Table 10. In particular, the descriptor for syntax elements cu_sbt_quad_flag and cu_sbt_pos_flag changes from ae(v) to u(1).

TABLE 10

| modification to the coding unit syntax specified in VVC draft 5. | |
|---|---|
| coding_unit( x0, y0, cb Width, cbHeight, treeType ) { | Descriptor |
| ... | |
| if( cu_cbf ) { | |
| if( CuPredMode[ x0 ][ y0 ] == MODE_INTER && sps_sbt_enabled flag && | |
| !ciip flag[ x0 ][ y0 ] && !MergeTriangleFlag[ x0 ][ y0 ] ) { | |
| if( cbWidth <= MaxSbtSize && cbHeight <= MaxSbtSize ) { | |
| allowSbtVerH = cbWidth >= 8 | |
| allowSbtVerQ = cbWidth >= 16 | |
| allowSbtHorH = cbHeight >= 8 | |
| allowSbtHorQ = cbHeight >= 16 | |
| if( allowSbtVerH \| \| allowSbtHorH \| \| allow Sbt \| \| VerQ allowSbtHorQ ) | |
| cu_sbt_flag | ae(v) |
| } | |
| if( cu_sbt_flag ) { | |
| if( ( allowSbtVerH \| \| allowSbtHorH ) && ( allowSbtVerQ \| \| | |
| allowSbtHorQ) ) | |
| ~~cu_sbt_quad_flag~~ | ~~ae(v)~~ |
| cu_sbt_quad_flag | u(1) |
| if( ( cu_sbt_quad flag && allowSbtVerQ && allow SbtHorQ ) \| \| | |
| ( !cu sbt_quad flag && allowSbtVerH && allowSbtHorH ) ) | |
| cu_sbt_horizontal_flag | ae(v) |
| ~~cu_sbt_pos_flag~~ | ~~ae(v)~~ |
| cu_sbt_pos_flag | u(1) |
| } | |
| } | |
| transform_tree( x0, y0, cbWidth, cbHeight, treeType ) | |
| } | |
| } | |
| } | |

Signaling of Intra Sub-Partition Coding Mode

Intra Sub-Partition in VVC Draft 5

The intra sub-partition (ISP) coding mode specified in VVC draft 5 can split horizontally or vertically an INTRA CU into 2 or 4 sub-partitions. The splitting depends on the block size, as shown in Table 11. Basically, a 4×4 CU cannot be further split. A CU of size 4×8 or 8×4 is split into 2 Tus (i.e., sub-partitions). Other CUs are split into 4 Tus.

TABLE 11

| number of ISP sub-partitions according to the CU size | |
|---|---|
| Block Size | Number of Sub-Partitions |
| 4 × 4 | Not divided |
| 4 × 8 and 8 × 4 | 2 |
| All other cases | 4 |

Figures 20A, 20B:
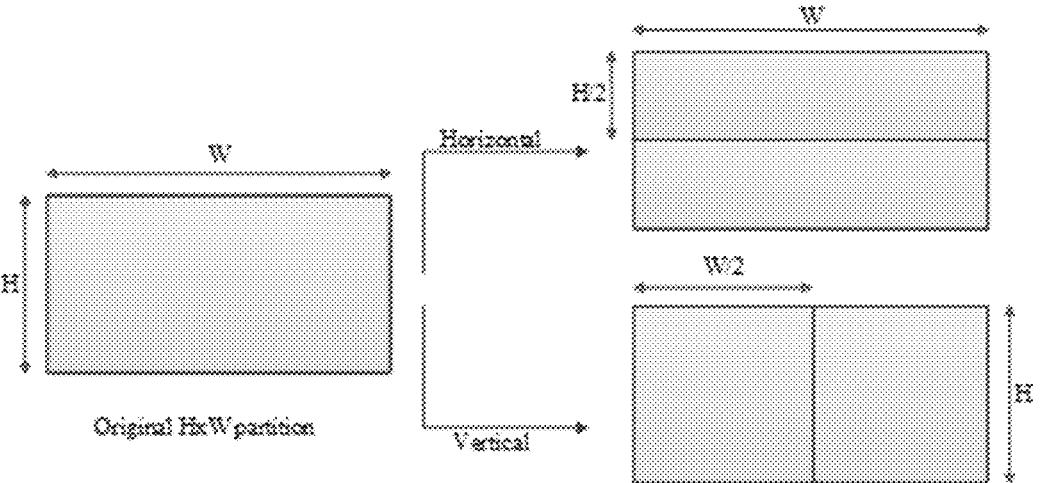
FIG. 20A illustrates allowed ISP splits for 4×8 and 8×4 INTRA coding units.
FIG. 20B illustrates allowed ISP splits for INTRA coding units with a size different from 4×8 or 8×4.

FIG. 20A illustrates allowed ISP splits for 4×8 and 8×4 INTRA coding units, and FIG. 20B illustrates allowed ISP splits for INTRA coding units with a size different from 4×8 or 8×4. Inside a CU coded in the ISP mode, TUs are decoded sequentially, and are intra-predicted from TU to TU using the same intra prediction mode, which is signaled on the CU level. Finally, the residual coding is also adapted according to the intra sub-partitions sizes. Indeed, sub-partitions may be of size 1×N, N×1, 2×N or N×2, coding group of size 1×16, 1×1, 2×16 or 16×2 are used in these respective cases.

The ISP coding mode is signaled through two successive flags in VVC draft 5.

The intra_subpartitions_mode_flag indicates the use of the ISP mode for a give Intra CU.

The intra_subpartitions_split_flag indicates the orientation of the split into an intra sub-partition.

The two above flags are used to decode the value of "IntraSubPartitionsSplitType" associated with the considered CU, as follows:

IntraSubPartitionsSplitType=intra_subpartitions_mode_flag==0?0:
(1+intra_subpartitions_split_flag)

The meaning of the "IntraSubPartitionsSplitType" value is shown in Table 12.

TABLE 12

| meaning of the IntraSubPartitionsSplitType as specified in VVC draft 5. | |
|---|---|
| Intra SubPartitionsSplitType | Name of IntraSubPartitionsSplitType |
| 0 | ISP_NO_SPLIT |
| 1 | ISP_HOR_SPLIT |
| 2 | ISP_VER_SPLIT |

These two flags are context-based coded according to VVC draft 5, as indicated in Table 13.

TABLE 13

| truncated table from VVC draft 5, indicating the entropy coding mode used for the ISP related syntax elements. | | | | | | |
|---|---|---|---|---|---|---|
| | binIdx | | | | | |
| Syntax element | 0 | 1 | 2 | 3 | 4 | >= 5 |
| ... | ... | ... | ... | ... | ... | ... |
| intra_subpartitions_mode_flag | 0 | na | na | na | na | na |
| intra_subpartitions_split_flag | 0 | na | na | na | na | na |
| ... | ... | ... | ... | ... | ... | ... |

Simplified Coding of the ISP Mode

In one embodiment, the bin 'intra_subpartitions_split_flag', i.e., the second flag used to code the ISP mode of a CU, is to be coded in the bypass mode. The modification to VVC draft 5 specification associated with this embodiment is shown in Table 14 and Table 15. In particular, the descriptor for syntax element 'intra_subpartitions_split_flag' changes from ae(v) to u( )$_{91}$

TABLE 14 modification to VVC draft 5 table specifying the CABAC context assignment to syntax elements.

| Syntax element | binIdx | | | | | |
|---|---|---|---|---|---|---|
| | 0 | 1 | 2 | 3 | 4 | >= 5 |
| . . . | . . . | . . . | . . . | . . . | . . . | . . . |
| intra_subpartitions_mode_flag | 0 | na | na | na | na | na |
| intra_subpartitions_split_flag | bypass | na | na | na | na | na |
| . . . | . . . | . . . | . . . | . . . | . . . | . . . |

TABLE 15 modification to the coding unit syntax in VVC draft 5.

| coding_unit( x0, y0, cbWidth, cbHeight, treeType ) { | Descriptor |
|---|---|
| ... | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \| \| treeType = = DUAL_TREE_LUMA | |
| ) { | |
|         if( ( y0 % CtbSizeY) > 0 ) | |
|           intra_luma_ref_idx[ x0 ][ y0 ] | ae(v) |
|         if (intra_luma_ref_idx[ x0 ][ y0 ] = = 0 && | |
|           ( cb Width <= MaxTbSizeY \| \| cbHeight <= MaxTbSizeY ) && | |
|           ( cbWidth * cbHeight > MinTbSize Y * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |
|           cb Width <= MaxTbSizeY && cbHeight <= MaxTbSizeY ) | |
|           ~~intra_subpartitions_split_flag[x0][y0]~~ | ~~ae(v)~~ |
|           <u>intra subpartitions split flag[ x0 ][ y0 ]</u> | <u>u(1)</u> |
|         if( intra_luma_ref_idx[ x0 ][ y0 ] = = 0 && | |
|           intra_subpartitions_mode_flag[ x0 ][ y0 ] = = 0) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE TREE treeType = = DUAL_TREE_CHROMA | |
| ) | |
|         intra_chroma_pred_mode[ x0 ][ y0 ] | ae(v) |
|     } | |
| ... | |

Signaling of Multiple Reference Line Intra Prediction
Multiple Reference Line Intra Prediction in VVC Draft 5

Figure 21:
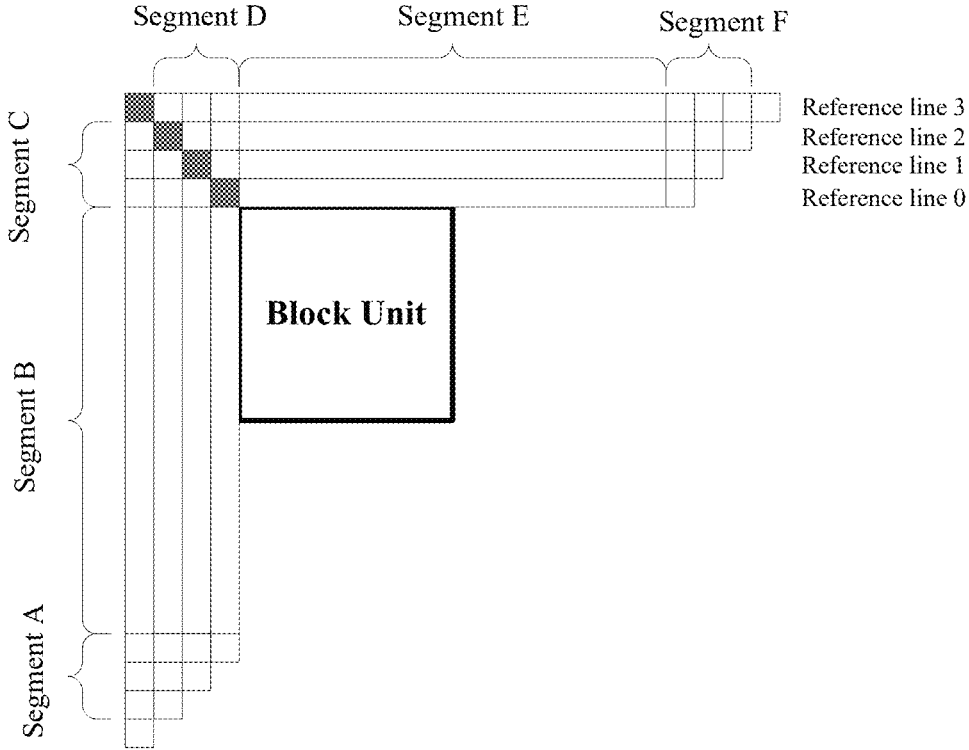
FIG. 21 illustrates the principle of multiple reference line intra prediction.

The multiple reference line intra prediction used in INTRA CUs in VVC draft 5 performs angular intra prediction of a luma block based on reconstructed reference samples that belong to one reference line and column above and on the left of the current CU, chosen among 3 reference lines. The reference line used for intra prediction is signaled in the bit-stream, through the syntax element 'intra_luma_ref_idx'. Each reference line is identified by its index, as shown in FIG. 21. The reference actually used in VVC draft 5 are the lines 0, 1 and 3 shown in FIG. 21. This syntax element is signaled before the intra prediction mode. In case a reference line different from the line 0, i.e. the line closest to the CU.

The 'intra_luma_ref_idx' is coded as follows. It is binarized as a Truncated Rice bin string. This means it is coded by a series of regular CABAC bins equal to 1, terminated by a regular CABAC bin equal to 0. Overall, up to 3 bins are signaled.

Figure 22:
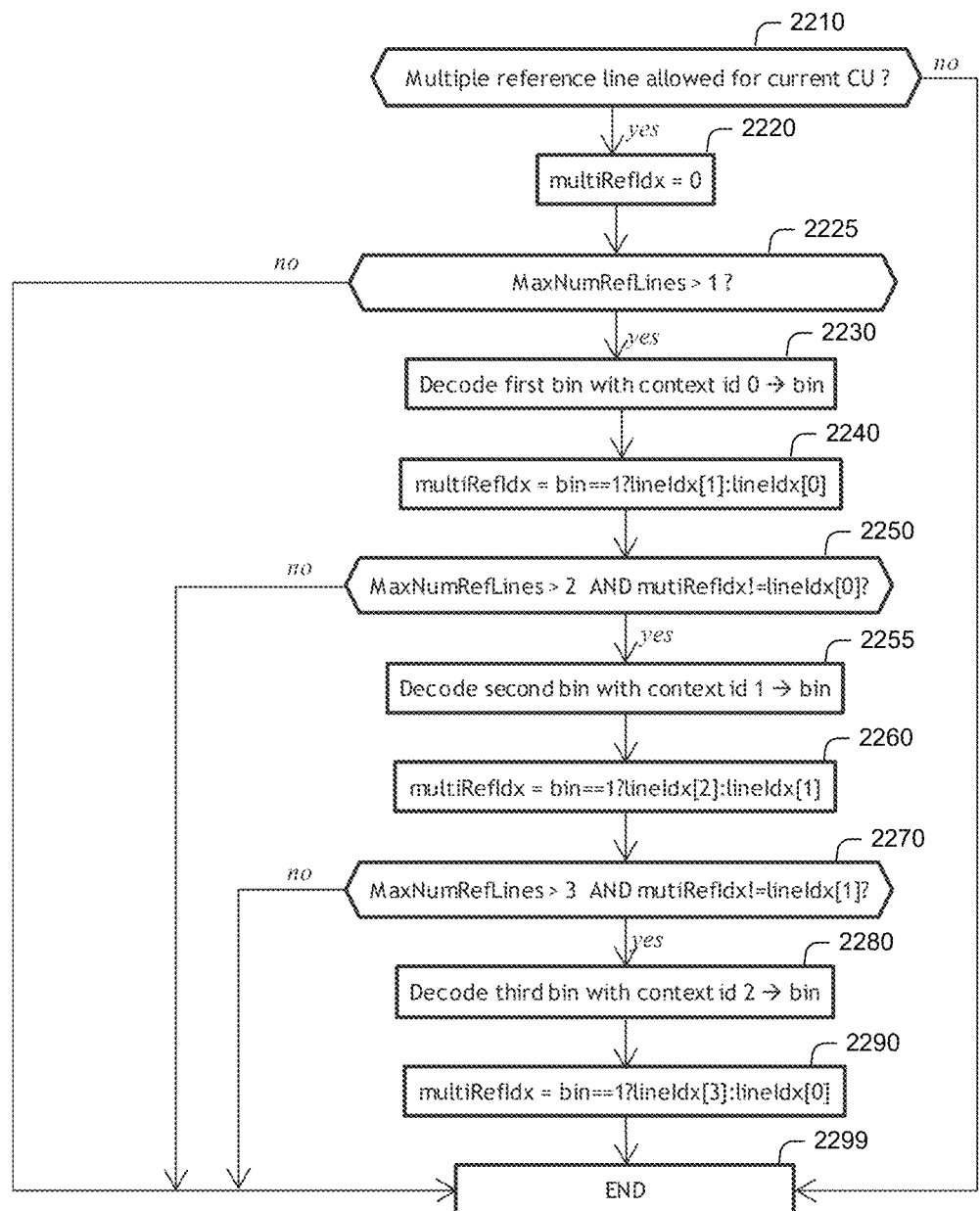
FIG. 22 illustrates a process of parsing the 'intra_luma_ref_idx' syntax element in VVC draft 5.

The decoding process of the 'intra_luma_ref_idx' according to VVC draft 5 is depicted in FIG. 22. In FIG. 22, a generic process involving up to 4 reference lines is used. The array lineIDx[.] is made of 4 line reference indices, and the value 'MaxNumRefLlnes' represents the maximum number of allowed reference lines for intra prediction. 'MaxNumRefLlnes' is equal to 3 for VVC, and the array lineIdx is made of the following elements:

lineIdx={0,1,3}.

The VVC decoding process of the syntax element 'intra_luma_ref_idx' proceeds as follows. The output of the process is the decoded multiRefIdx. In particular, at step 2210, it checks whether multiple reference lines are allowed for the current CU. If yes, the output value multiRefIdx is initialized (2220) to 0. If MaxNumRefLines is not higher than (2225) 1, then the process is over. Otherwise, at step 2230, a CABAC regular bin is parsed with a single CABAC context, with index 0. If it is equal to 0 then the multiRefIdx value is unchanged and the process is over. Otherwise, multiRefIdx is set equal to lineIdx[1].

At step 2255, if MaxNumRefLines is strictly higher than (2250) 2, then a second regular CABAC bin is decoded with a single context with identifier 1. If the decoded bin is 0 then the multiRefIdx is unchanged and the process is over. Otherwise, mutiRefIdx is set (2260) equal to lineIdx[2]. If MaxNumRefLines is strictly higher than (2270) 3, then a third regular CABAC bin is decoded (2280) with a single context with identifier 2. If the decoded bin is 0 then the multiRefIdx is unchanged and the process is over (2299). Otherwise, mutiRefIdx is set (2290) equal to lineIdx[3]. Note that in practice this step does not happen according to the VVC draft 5 specification, because in the design chosen for VVC draft 5, at most 3 reference lines can be used as stated above. Thus the conditional "MaxNumRefLines>3" is always false in the scope of VVC draft 5.

As already explained and shown in the Table 16, two regular coded bins are used to signal the intra_luma_ref_idx syntax element in VVC draft 5, each bin using a single CABAC context.

TABLE 16

CABAC context assignment to context-based coded bins of the 'intra_luma_ref_idx', as in VVC draft 5.

| Syntax element | binIdx | | | | | |
|---|---|---|---|---|---|---|
| | 0 | 1 | 2 | 3 | 4 | >= 5 |
| . . . | . . . | . . . | . . . | . . . | . . . | . . . |
| intra_luma_ref_idx[ ][ ] | 0 | 1 | na | na | na | na |
| . . . | . . . | . . . | . . . | . . . | . . . | . . . |

Simplified Coding of the Multiple Reference Line Index

Figure 23:
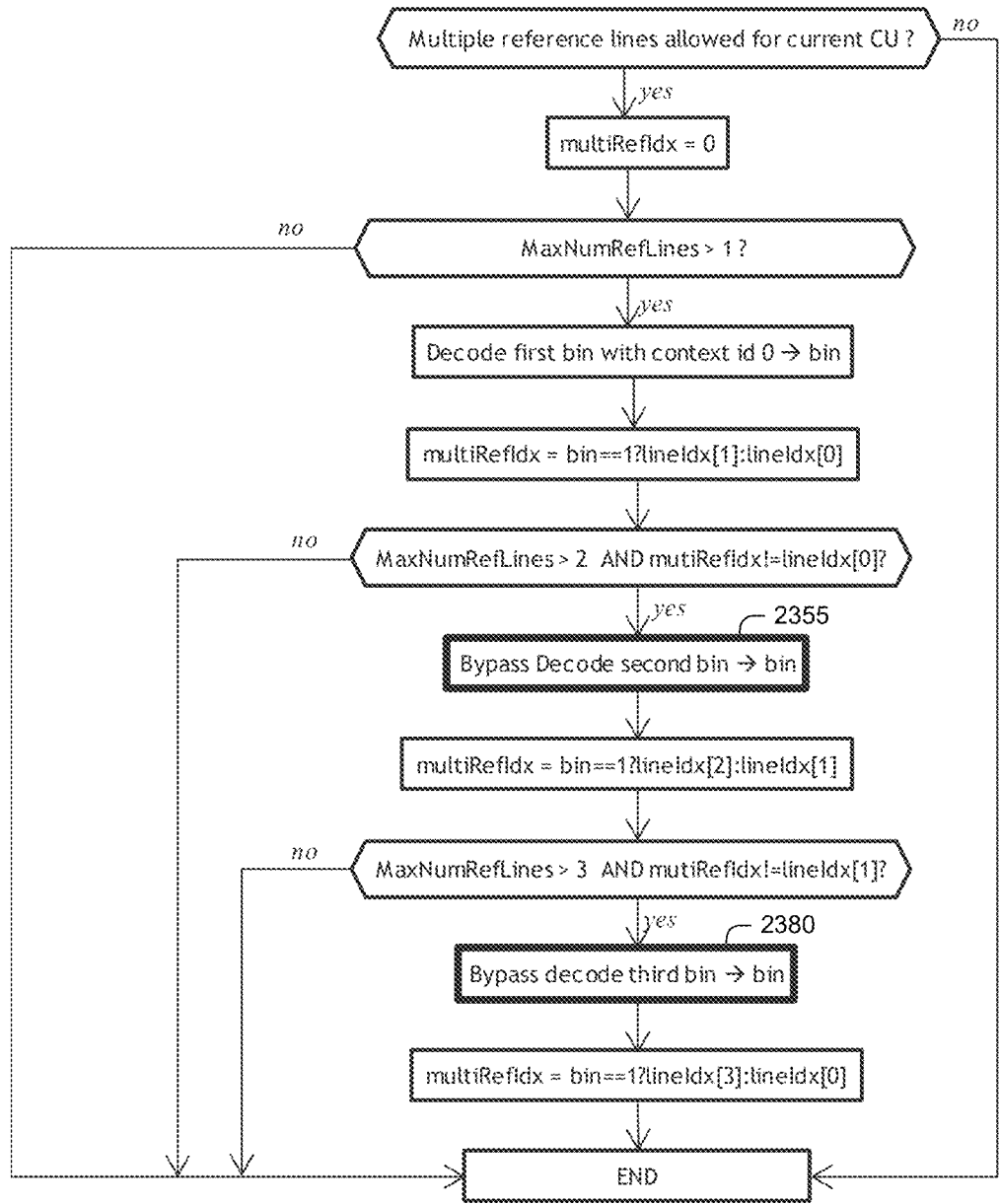
FIG. 23 illustrate a simplified process of parsing the 'intra_luma_ref_idx' syntax element, according to an embodiment.

In one embodiment, the coding of the 'intra_luma_ref_idx' syntax element is simplified, and only the first bin of this syntax element is coded in the regular mode. The proposed modified parsing process for this syntax element is depicted in FIG. 23. In particular, at steps 2355 and 2380, the According to this embodiment, the VVC draft 5 specification can be modified as shown in Table 17.

TABLE 17

CABAC context assignment to context-based coded bins of 'intra_luma_ref_idx'

| Syntax element | binIdx | | | | | |
|---|---|---|---|---|---|---|
| | 0 | 1 | 2 | 3 | 4 | >= 5 |
| . . . | . . . | . . . | . . . | . . . | . . . | . . . |
| intra_luma_ref_idx[ ][ ] | 0 | bypass | na | na | na | na |
| . . . | . . . | . . . | . . . | . . . | . . . | . . . |

Signaling of the SMVD flag

SMVD flag in VVC draft 5

The sym_mvd_flag syntax element indicates the use of symmetrical motion vector difference for an INTER coding unit. The SMVD motion vector coding process of VVC codes the motion vector difference of a given CU with regard to the first reference picture list L0. Then the motion vector difference of the considered CU in the other reference picture list (L1) is deduced from the L0 motion vector difference. Indeed, in this mode, the two motions vector differences are symmetrical. The L1 motion vector difference is equal to the opposite of the L0 motion vector difference, in both x- and y-components. In VVC draft 5, this sym_mvd_flag is coded and decoded in the regular CABAC mode with a single CABAC context.

Simplified Coding of the SMVD Flag

In one embodiment, it is proposed to encode and decode this flag in the bypass mode. The proposed simplification does not affect the compression efficiency of VVC. According to this embodiment, the VVC draft 5 syntax specification can be modified as shown in Table 18. In particular, the descriptor for svm_mvd_flag changes from ae(v) to u(1).

TABLE 18

Simplified signaling of the smvd_flag over VVC draft 5

| coding_unit( x0, y0, cbWidth, cbHeight, treeType ) { | Descriptor |
|---|---|
| ... | |
|   if( slice_type = = B) | |
|     inter_pred_idc[ x0 ][ y0 ] | ae(v) |
|   if( sps_affine_enabled_flag && cbWidth >= 16 && cbHeight >= 16 ) { | |
|     inter_affine_flag[ x0 ][ y0 ] | ae(v) |
|     if( sps_affine_type_flag && inter_affine_flag[ x0 ][ y0 ] ) | |
|       cu_affine_type_flag[ x0 ][ y0 ] | ae(v) |
|   if( sps_smvd_enabled_flag && inter_pred_idc[ x0 ][ y0 ] = = PRED_BI && | |
|   !inter_affine_flag[ x0 ][ y0 ] && RefIdxSymL0 > −1 && RefIdxSymL1 > −1 | |
|   ) | |
|     ~~sym_mvd_flag[x0][y0]~~ | ~~ae(v)~~ |
|     <ins>sym_mvd_flag[ x0 ][ y0 ]</ins> | <ins>u(1)</ins> |
|   if( inter_pred_idc[ x0 ][ y0 ] != PRED_L1 ) { | |
|     if( NumRefIdxActive[ 0 ] > 1 && !sym_mvd_flag[ x0 ][ y0 ] ) | |
|       ref_idx_l0[ x0 ][ y0 ] | ae(v) |
|     mvd_coding(x0, y0, 0, 0 ) | |
|     if( MotionModelIdc[ x0 ][ y0 ] > 0 ) | |
|       mvd_coding( x0, y0, 0, 1 ) | |
|     if(MotionModelIdc[ x0 ][ y0 ] > 1 ) | |
|       mvd_coding( x0, y0, 0, 2 ) | |
|     mvp_l0_flag[ x0 ][ y0 ] | ae(v) |
|   } else { | |
|     MvdL0[ x0 ][ y0 ][ 0 ] = 0 | |
|     MvdL0[ x0 ][ y0 ][ 1 ] = 0 | |
|   } | |
| ... | | second bin and the third bin are to be decoded in the bypass mode. Other steps are similar to those shown in FIG. 22.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the entropy encoding and decoding modules (145, 230), of a video encoder 100 and decoder 200 as shown in FIG. 1 and FIG. 4. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application, for example, the context model IDs. The specific values are for example purposes and the aspects described are not limited to these specific values.

Figure 24:
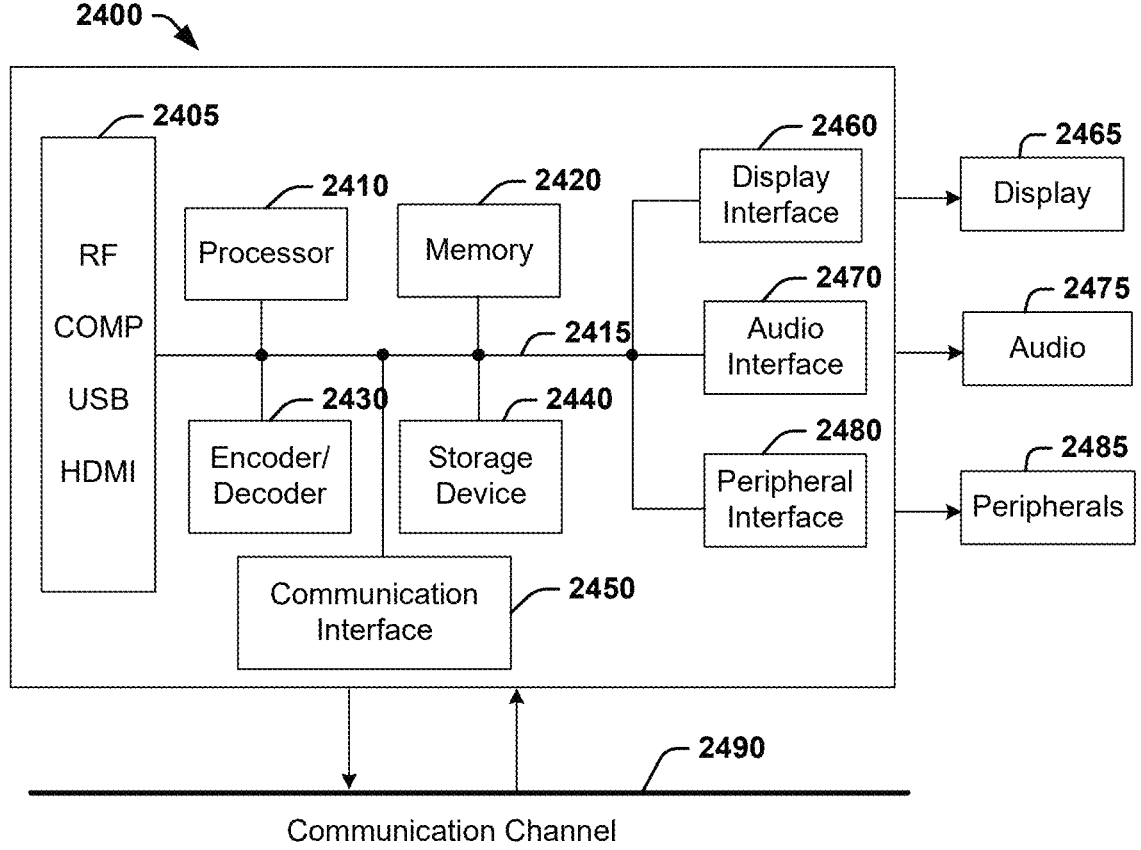
FIG. 24 illustrates a block diagram of a system within which aspects of the present embodiments may be implemented.

FIG. 24 illustrates a block diagram of an example of a system in which various aspects and embodiments are implemented. System 2400 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 2400, singly or in combination, may be embodied in a single integrated circuit, multiple ICs, and/or discrete components. For example, in at least one embodiment, the processing and encoder/decoder elements of system 2400 are distributed across multiple ICs and/or discrete components. In various embodiments, the system 2400 is communicatively coupled to other systems, or to other electronic devices, via, for example, a communications bus or through dedicated input and/or output ports. In various embodiments, the system 2400 is configured to implement one or more of the aspects described in this application.

The system 2400 includes at least one processor 2410 configured to execute instructions loaded therein for implementing, for example, the various aspects described in this application. Processor 2410 may include embedded memory, input output interface, and various other circuitries as known in the art. The system 2400 includes at least one memory 2420 (e.g., a volatile memory device, and/or a non-volatile memory device). System 2400 includes a storage device 2440, which may include non-volatile memory and/or volatile memory, including, but not limited to, EEPROM, ROM, PROM, RAM, DRAM, SRAM, flash, magnetic disk drive, and/or optical disk drive. The storage device 2440 may include an internal storage device, an attached storage device, and/or a network accessible storage device, as non-limiting examples.

System 2400 includes an encoder/decoder module 2430 configured, for example, to process data to provide an encoded video or decoded video, and the encoder/decoder module 2430 may include its own processor and memory. The encoder/decoder module 2430 represents module(s) that may be included in a device to perform the encoding and/or decoding functions. As is known, a device may include one or both of the encoding and decoding modules. Additionally, encoder/decoder module 2430 may be implemented as a separate element of system 2400 or may be incorporated within processor 2410 as a combination of hardware and software as known to those skilled in the art.

Program code to be loaded onto processor 2410 or encoder/decoder 2430 to perform the various aspects described in this application may be stored in storage device 2440 and subsequently loaded onto memory 2420 for execution by processor 2410. In accordance with various embodiments, one or more of processor 2410, memory 2420, storage device 2440, and encoder/decoder module 2430 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 2410 and/or the encoder/decoder module 2430 is used to store instructions and to provide working memory for processing that is needed during encoding or decoding. In other embodiments, however, a memory external to the processing device (for example, the processing device may be either the processor 2410 or the encoder/decoder module 2430) is used for one or more of these functions. The external memory may be the memory 2420 and/or the storage device 2440, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 2400 may be provided through various input devices as indicated in block 2405. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 2405 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 2400 to other electronic devices across USB and/or HDMI connections. It is to be understood that various aspects of input processing, for example, Reed-Solomon error correction, may be implemented, for example, within a separate input processing IC or within processor 2410 as necessary. Similarly, aspects of USB or HDMI interface processing may be implemented within separate interface ICs or within processor 2410 as necessary. The demodulated, error corrected, and demultiplexed stream is provided to various processing elements, including, for example, processor 2410, and encoder/decoder 2430 operating in combination with the memory and storage elements to process the datastream as necessary for presentation on an output device.

Various elements of system 2400 may be provided within an integrated housing, Within the integrated housing, the various elements may be interconnected and transmit data therebetween using suitable connection arrangement 2415, for example, an internal bus as known in the art, including the I2C bus, wiring, and printed circuit boards.

The system 2400 includes communication interface 2450 that enables communication with other devices via communication channel 2490. The communication interface 2450 may include, but is not limited to, a transceiver configured to transmit and to receive data over communication channel 2490. The communication interface 2450 may include, but is not limited to, a modem or network card and the communication channel 2490 may be implemented, for example, within a wired and/or a wireless medium.

Data is streamed to the system 2400, in various embodiments, using a Wi-Fi network such as IEEE 802.11. The Wi-Fi signal of these embodiments is received over the communications channel 2490 and the communications interface 2450 which are adapted for Wi-Fi communications. The communications channel 2490 of these embodiments is typically connected to an access point or router that provides access to outside networks including the Internet for allowing streaming applications and other over-the-top communications. Other embodiments provide streamed data to the system 2400 using a set-top box that delivers the data over the HDMI connection of the input block 2405. Still other embodiments provide streamed data to the system 2400 using the RF connection of the input block 2405.

The system 2400 may provide an output signal to various output devices, including a display 2465, speakers 2475, and other peripheral devices 2485. The other peripheral devices 2485 include, in various examples of embodiments, one or more of a stand-alone DVR, a disk player, a stereo system, a lighting system, and other devices that provide a function based on the output of the system 2400. In various embodiments, control signals are communicated between the system 2400 and the display 2465, speakers 2475, or other peripheral devices 2485 using signaling such as AV.Link, CEC, or other communications protocols that enable device-to-device control with or without user intervention. The output devices may be communicatively coupled to system 2400 via dedicated connections through respective interfaces 2460, 2470, and 2480. Alternatively, the output devices may be connected to system 2400 using the communications channel 2490 via the communications interface 2450. The display 2465 and speakers 2475 may be integrated in a single unit with the other components of system 2400 in an electronic device, for example, a television. In various embodiments, the display interface 2460 includes a display driver, for example, a timing controller (T Con) chip.

The display 2465 and speaker 2475 may alternatively be separate from one or more of the other components, for example, if the RF portion of input 2405 is part of a separate set-top box. In various embodiments in which the display 2465 and speakers 2475 are external components, the output signal may be provided via dedicated output connections, including, for example, HDMI ports, USB ports, or COMP outputs.

According to an embodiment, a method of video decoding is provided, comprising: decoding a plurality of binary symbols from a bitstream, wherein the first binary symbol of said plurality of binary symbols is decoded using a bypass mode of an entropy decoding engine; and generating a value for a syntax element responsive to said plurality of binary symbols, based on a binarization scheme.

According to an embodiment, a method of video encoding is provided, comprising: accessing a plurality of binary symbols indicative of a value of a syntax element; and encoding said plurality of binary symbols, wherein the first binary symbol of said plurality of binary symbols is encoded using a bypass mode of an entropy encoding engine.

According to another embodiment, an apparatus for video decoding is provided, comprising one or more processors, wherein said one or more processors are configured to: decode a plurality of binary symbols from a bitstream, wherein the first binary symbol of said plurality of binary symbols is decoded using a bypass mode of an entropy decoding engine; and generate a value for a syntax element responsive to said plurality of binary symbols, based on a binarization scheme. The apparatus may further comprise one or more memories coupled to said one or more processors.

According to another embodiment, an apparatus for video encoding is provided, comprising one or more processors, wherein said one or more processors are configured to: access a plurality of binary symbols indicative of a value of a syntax element; and encode said plurality of binary symbols, wherein the first binary symbol of said plurality of binary symbols is encoded using a bypass mode of an entropy encoding engine.

According to another embodiment, an apparatus of video decoding is provided, comprising: means for decoding a plurality of binary symbols from a bitstream, wherein the first binary symbol of said plurality of binary symbols is decoded using a bypass mode of an entropy decoding engine; and means for generating a value for a syntax element responsive to said plurality of binary symbols, based on a binarization scheme.

According to another embodiment, an apparatus of video encoding is provided, comprising: means for accessing a plurality of binary symbols indicative of a value of a syntax element; and means for encoding said plurality of binary symbols, wherein the first binary symbol of said plurality of binary symbols is encoded using a bypass mode of an entropy encoding engine.

According to another embodiment, a signal comprising encoded video is formed by performing: accessing a plurality of binary symbols indicative of a value of a syntax element; and encoding said plurality of binary symbols, wherein the first binary symbol of said plurality of binary symbols is encoded using a bypass mode of an entropy decoding engine.

According to an embodiment, one or more other binary symbols of said plurality of binary symbols are decoded or encoded using said bypass mode.

According to an embodiment, the rest of said plurality of binary symbols are context-based decoded or encoded. Each binary symbol of the rest of said plurality of binary symbols may use a different context model. In another embodiment, all binary symbols of said plurality of binary symbols are decoded or encoded using said bypass mode.

According to an embodiment, a binary flag is context-based encoded or decoded, wherein said value of said syntax element is generated further responsive to said binary flag.

In one embodiment, said flag indicates whether an equal weight is applied in generating said weighted average of two temporal predictors of said block.

According to an embodiment, said syntax element indicates an index of a weight used in generating a weighted average of two temporal predictors of a block.

In one embodiment, said syntax element indicates which motion vector predictor is to be used for encoding or decoding a motion vector of a block.

In one embodiment, it is determined if SMVD (Symmetrical Motion Vector Difference) is applied to said block, and said bypass mode is only used if SMVD is applied to said block.

In one embodiment, truncated Rice binarization is used as the binarization scheme.

In one embodiment, a syntax element, which indicates a position of a non-zero residual transform unit used to code texture data of a current coding unit when sub-block transform is used, is encoded and decoded in a bypass mode.

In one embodiment, a syntax element, which indicates whether asymmetric binary split is used in sub-block transform, is encoded and decoded in a bypass mode.

In one embodiment, a syntax element, which indicates the orientation of binary split used in sub-block transform, is encoded and decoded in a bypass mode.

In one embodiment, a syntax element, which indicates orientation of splitting a current coding unit into intra sub-partition, is encoded and decoded in a bypass mode.

In one embodiment, the first bin used to represent a syntax element, which indicates which reference line is used for intra prediction, is encoded and decoded in a regular mode, and one or more remaining bins used to represent said syntax element are encoded and decoded in a bypass mode.

In one embodiment, a syntax element, which indicates whether symmetrical motion vector difference coding mode is used for a current coding unit, is encoded and decoded in a bypass mode.

An embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

Note that the syntax elements as used herein, for example, syntax used to characterize the GBi index, are descriptive terms. As such, they do not preclude the use of other syntax element names.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals the number of pieces in the piece-wise linear model to the decoder. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method, comprising:
decoding a plurality of binary symbols representing a syntax element, wherein one or more binary symbols at beginning of said plurality of binary symbols are entropy decoded using a bypass mode, and wherein the rest of said plurality of binary symbols is entropy decoded in a context-based mode; and obtaining said syntax element from said plurality of binary symbols, based on a binarization scheme.

2. The method of claim 1, wherein said binarization scheme is a truncated Rice binarization scheme.

3. The method of claim 1, wherein said syntax element indicates, from a set of weighting factors, a weighting factor for weighting one of two predictors when forming a weighted sum of said two predictors.

4. The method of claim 3, wherein another weighting factor is obtained responsive to said weighting factor, said another weighting factor used in weighting another one of said two predictors when forming said weighted sum.

5. The method of claim 1, wherein each binary symbol of said rest of said plurality of binary symbols uses a different context model.

6. A method, comprising:
accessing a block to be encoded; and
encoding a syntax element,
wherein a plurality of binary symbols representing said syntax element are obtained based on a binarization scheme,
wherein one or more binary symbols at beginning of said plurality of binary symbols are entropy encoded using a bypass mode, and
wherein the rest of said plurality of binary symbols is entropy encoded in a context-based mode.

7. The method of claim 6, wherein said binarization scheme is a truncated Rice binarization scheme.

8. The method of claim 6, wherein said syntax element indicates, from a set of weighting factors, a weighting factor for weighting one of two predictors when forming a weighted sum of said two predictors.

9. The method of claim 8, wherein another weighting factor is obtained responsive to said weighting factor, said another weighting factor used in weighting another one of said two predictors when forming said weighted sum.

10. The method of claim 6, wherein each binary symbol of said rest of said plurality of binary symbols uses a different context model.

11. An apparatus, comprising one or more processors, wherein said one or more processors are configured to:
decode a plurality of binary symbols representing a syntax element, wherein one or more binary symbols at beginning of said plurality of binary symbols are entropy decoded using a bypass mode, and wherein the rest of said plurality of binary symbols is entropy decoded in a context-based mode; and
obtain said syntax element from said plurality of binary symbols, based on a binarization scheme.

12. The apparatus of claim 11, wherein said binarization scheme is a truncated Rice binarization scheme.

13. The apparatus of claim 11, wherein said syntax element indicates, from a set of weighting factors, a weighting factor for weighting one of two predictors when forming a weighted sum of said two predictors.

14. The apparatus of claim 13, wherein another weighting factor is obtained responsive to said weighting factor, said another weighting factor used in weighting another one of said two predictors when forming said weighted sum.

15. The apparatus of claim 11, wherein each binary symbol of said rest of said plurality of binary symbols uses a different context model.

16. An apparatus, comprising one or more processors, wherein said one or more processors are configured to:

access a block to be encoded; and encode a syntax element, wherein a plurality of binary symbols representing a syntax element are obtained based on a binarization scheme, wherein one or more binary symbols at beginning of said plurality of binary symbols are entropy encoded using a bypass mode, and wherein the rest of said plurality of binary symbols is entropy encoded in a context-based mode.

17. The apparatus of claim 16, wherein said binarization scheme is a truncated Rice binarization scheme.

18. The apparatus of claim 16, wherein said syntax element indicates, from a set of weighting factors, a weighting factor for weighting one of two predictors when forming a weighted sum of said two predictors.

19. The apparatus of claim 18, wherein another weighting factor is obtained responsive to said weighting factor, said another weighting factor used in weighting another one of said two predictors when forming said weighted sum.

20. The apparatus of claim 16, wherein each binary symbol of said rest of said plurality of binary symbols uses a different context model.

\* \* \* \* \*